US011829922B2

(12) United States Patent
Waris et al.

(10) Patent No.: US 11,829,922 B2
(45) Date of Patent: *Nov. 28, 2023

(54) SYSTEM AND METHOD FOR MANAGING TRANSPORTATION AND STORAGE OF GOODS

(71) Applicant: COREORIENT OY, Helsinki (FI)

(72) Inventors: Heikki Pekka Waris, Helsinki (FI); Harri Lauri Paloheimo, Espoo (FI)

(73) Assignee: COREORIENT OY, Espoo (FI)

( * ) Notice: Subject to any disclaimer, the term of this patent is extended or adjusted under 35 U.S.C. 154(b) by 528 days.

This patent is subject to a terminal disclaimer.

(21) Appl. No.: 16/905,665

(22) Filed: Jun. 18, 2020

(65) Prior Publication Data

US 2020/0320464 A1    Oct. 8, 2020

Related U.S. Application Data

(60) Division of application No. 15/664,084, filed on Jul. 31, 2017, now Pat. No. 10,699,239, which is a
(Continued)

(51) Int. Cl.
*G06Q 10/083* (2023.01)
*G06Q 10/0833* (2023.01)
(Continued)

(52) U.S. Cl.
CPC ......... *G06Q 10/083* (2013.01); *G06Q 10/08* (2013.01); *G06Q 10/0833* (2013.01); *G06Q 10/08355* (2013.01); *G06Q 50/28* (2013.01)

(58) Field of Classification Search
None
See application file for complete search history.

(56) References Cited

U.S. PATENT DOCUMENTS 6,882,269 B2 * 4/2005 Moreno ............... A47G 29/141
340/568.1
7,049,963 B2 * 5/2006 Waterhouse ........... G06Q 50/30
340/505
(Continued)

FOREIGN PATENT DOCUMENTS

| EP | 000001391579 A1 | 2/2004 |
|---|---|---|
| EP | 1391579 A1 | 2/2004 |
| EP | 2146328 A2 | 1/2010 |

OTHER PUBLICATIONS

EP Office Action dated Jan. 17, 2017.
PCT ISR and WO Ser. No. PCT/FI2014/050159 dated May 22, 2014 (May 22, 2014).

*Primary Examiner* — Dennis W Ruhl
(74) *Attorney, Agent, or Firm* — Carlos R. Villamar; The Villamar Firm PLLC

(57) ABSTRACT

A system and method for managing transportation and storage of packages to individuals, includes a server; first and second devices having a proximity interface; and a package control device attached to a package. The server and the first and second devices include respective processors, memories and communication network interfaces. The server and the package control device include transport and storage information including authentication information to authorize a handover of the package, and message authentication information determined using authorization key information of the server, which communicates the transport and storage information over the communication network interface to the first and second devices, wherein the first or second device receives same over the proximity interface from the package control device and compares the authentication information from the server and that received from the package control device to authorize the handover of the package.

18 Claims, 12 Drawing Sheets

Related U.S. Application Data continuation of application No. 13/828,287, filed on Mar. 14, 2013, now Pat. No. 9,721,224.

(51) Int. Cl.
*G06Q 10/0835* (2023.01)
*G06Q 10/08* (2023.01)
*G06Q 50/28* (2012.01)

(56) References Cited

U.S. PATENT DOCUMENTS

| | | | |
|---|---|---|---|
| 7,149,753 B2* | 12/2006 | Lin | G06Q 10/08 |
| 7,809,377 B1* | 10/2010 | Lau | H04W 4/029 |
| | | | 340/8.1 |
| 2002/0120475 A1* | 8/2002 | Morimoto | B65D 23/14 |
| | | | 705/4 |
| 2002/0178016 A1* | 11/2002 | McLellan | G07F 17/13 |
| | | | 340/568.1 |
| 2003/0204407 A1 | 10/2003 | Nabors et al. | |
| 2004/0113783 A1 | 6/2004 | Yagesh | |
| 2004/0149822 A1* | 8/2004 | Stevens | G07C 9/28 |
| | | | 235/385 |
| 2004/0178880 A1 | 9/2004 | Meyer et al. | |
| 2004/0246130 A1 | 12/2004 | Lambright et al. | |
| 2005/0038758 A1 | 2/2005 | Hilbush et al. | |
| 2005/0061215 A1 | 3/2005 | Wang et al. | |
| 2005/0110635 A1 | 5/2005 | Giermanski et al. | |
| 2006/0026030 A1* | 2/2006 | Jacobs | G06Q 10/083 |
| | | | 705/26.1 |
| 2006/0138223 A1* | 6/2006 | Schar | G07C 9/37 |
| | | | 235/384 |
| 2006/0290491 A1 | 12/2006 | Wagner et al. | |
| 2007/0040647 A1 | 2/2007 | Saenz et al. | |
| 2007/0096870 A1 | 5/2007 | Fisher | |
| 2007/0198290 A1* | 8/2007 | Kinory | G06Q 10/0836 |
| | | | 705/339 |
| 2008/0088454 A1 | 4/2008 | Flores et al. | |
| 2008/0230606 A1 | 9/2008 | Thompson et al. | |
| 2008/0294488 A1 | 11/2008 | Gupta et al. | |
| 2009/0015400 A1 | 1/2009 | Breed | |
| 2009/0151406 A1 | 6/2009 | Bao et al. | |
| 2009/0251295 A1 | 10/2009 | Norair et al. | |
| 2009/0295564 A1 | 12/2009 | Twitchell et al. | |
| 2009/0322510 A1 | 12/2009 | Berger et al. | |
| 2012/0249326 A1 | 10/2012 | Mostov | |
| 2018/0285806 A1* | 10/2018 | Scofield | G06Q 10/08 |

\* cited by examiner

SYSTEM AND METHOD FOR MANAGING TRANSPORTATION AND STORAGE OF GOODS

CROSS REFERENCE TO RELATED DOCUMENTS

The present invention is a divisional of U.S. patent application Ser. No. 15/664,084 of Heikki Pekka WARIS et al., entitled "SYSTEM AND METHOD FOR MANAGING TRANSPORTATION AND STORAGE OF GOODS," filed on Jul. 31, 2017, now U.S. Pat. No. 10,699,239, which is a continuation of U.S. patent application Ser. No. 13/828,287 of Heikki Pekka WARIS et al., entitled "SYSTEM AND METHOD FOR MANAGING TRANSPORTATION AND STORAGE OF GOODS," filed on Mar. 14, 2013, now U.S. Pat. No. 9,721,224, the entire disclosures of all of which are hereby incorporated by reference herein.

BACKGROUND OF THE INVENTION

Field of the Invention

The present invention generally relates to the transportation and storage of goods, and more particularly to a method and system for managing the transportation and storage of goods, and the like, by individual users, and the like.

Discussion of the Background

Systems have been developed for managing transportation and/or storage of goods. For example, various companies manage dedicated logistics facilities, vehicles and operators, and provide parcel delivery services to individuals. Similarly, retailers manage delivery of merchandise purchased by consumers to homes of the consumers. However, such systems and methods typically lack robustness with respect to managing transportation and/or storage of goods by some managing services, retail infrastructures, organizations lacking logistics, and the like. In addition, such systems and methods typically suffer from lack of convenience and ease of use, for example, by individuals for whom such transportation or storage of goods is just one activity among many daily routines.

SUMMARY OF THE INVENTION

Therefore, there is a need for a method and system that addresses the above and other problems. The above and other problems are addressed by the illustrative embodiments of the present invention, which provide a system and method for managing the transportation and storage of goods, and the like, and that allows senders, transporters, recipients, and the like, access via personal devices configured for arranging and controlling the quality of transportation services between each other. The system and method can include a package control device configured to authorize and control access to a package and its contents, register users who are in custody of the package at different times, and/or communicates instructions with the users during the transportation and storage process. The system and method also can include a storage facility with which the users can improve the availability of the transportation or storage service, or align interactions with their own schedules, and the like.

Accordingly, in illustrative aspects of the present invention there is provided a system and method for managing transportation and storage of packages to individuals, includes a server; first and second devices having a proximity interface; and a package control device attached to a package. The server and the first and second devices include respective processors, memories and communication network interfaces. The server and the package control device include transport and storage information including authentication information to authorize a handover of the package, and message authentication information determined using authorization key information of the server, which communicates the transport and storage information over the communication network interface to the first and second devices, wherein the first or second device receives same over the proximity interface from the package control device and compares the authentication information from the server and that received from the package control device to authorize the handover of the package.

The package control device comprises a Bluetooth device, a NFC device, or a RFID device, the proximity interface comprises a short range wireless interface, the RFID tag or the Bluetooth device comprises a package identifier and message authentication information determined using authorization key information of the server, the first or the second device receives the transport and storage information over the proximity interface from the package control device and compares the package identifier and the authentication information communicated with the server and from the package control device, and authorizes the handover of the package.

The package control device comprises a barcode, a QR-code, a printed symbol or a written symbol, the proximity interface comprises an optical interface, the barcode, QR-code, printed symbol or written symbol comprises a package identifier and message authentication information determined using authorization key information of the server, the first or the second device receives the transport and storage information over the proximity interface from the package control device and compares the package identifier and the authentication information communicated with the server and from the package control device, and authorizes the handover of the package.

The system and method further include the first or the second device comprising a sensor device; the first or the second device comprising a security device; the sensor device comprising a clock, a location sensor, an acceleration sensor, a proximity sensor, a pressure sensor, a light sensor or a camera; the security device comprising a lock or an alarm; wherein the first or the second device determines the handover of the package with the sensor device, and the first or the second device deactivates the security device if the handover is authorized.

The system and method further include the server having a compliance enforcement process; the transport and storage information comprising compliance information; the compliance information comprising information of an authorized timing or an authorized location of a handover; wherein the compliance enforcement process in the server generates compliance information for the transport and storage of the package, the first or the second device performs compliance measurements, the server or the first or the second device generates evaluated compliance information by comparing the compliance information and the compliance measurements, the compliance enforcement process in the server determines the reliability of the first or the second device based on the evaluated compliance information, and the server or the first or the second device authorizes a planned handover based on the reliability of the first or the second device.

The system and method further include a third device; the third device having a processor, a memory and a proximity interface; the authentication information comprising authentication information of the third device; wherein the third device communicates authentication information over the proximity interface with the first or the second device or the package control device, and the third device determines the authorization of the handover of the package in addition to authorization performed by the first or the second device.

The first or the second device is a storage device, the storage device comprises a stationary storage, a storage container, a transport vehicle or a driverless vehicle, the storage device attaches the package when receiving the package in a handover, the storage device detaches the package when releasing the package in a handover, and the attachment of the package to the storage comprises a wire, a strap, a lock, a proximity sensor, a camera or an alarm.

The system and method further include proximity information; the proximity information comprising threshold information of proximity distance or timing of proximity entry or exit, wherein the first or the second device determines the proximity information, and the first or the second device determines the handover by comparing the proximity information and threshold proximity information.

The server is in the first or the second device, the transport and storage information communicated by the server with the first or the second device comprises transport offer, transport request or transport performance information, and the server determines the authentication information employed to authorize a handover of the package by comparing the transport offer and the transport request and the transport performance information.

The system and method further include a user interface; the user interface configured for the presentation of the movement or direction of the user of the first or the second device relative to the package; wherein the first or the second device employs the user interface to perform the authorized handover of the package.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1A:
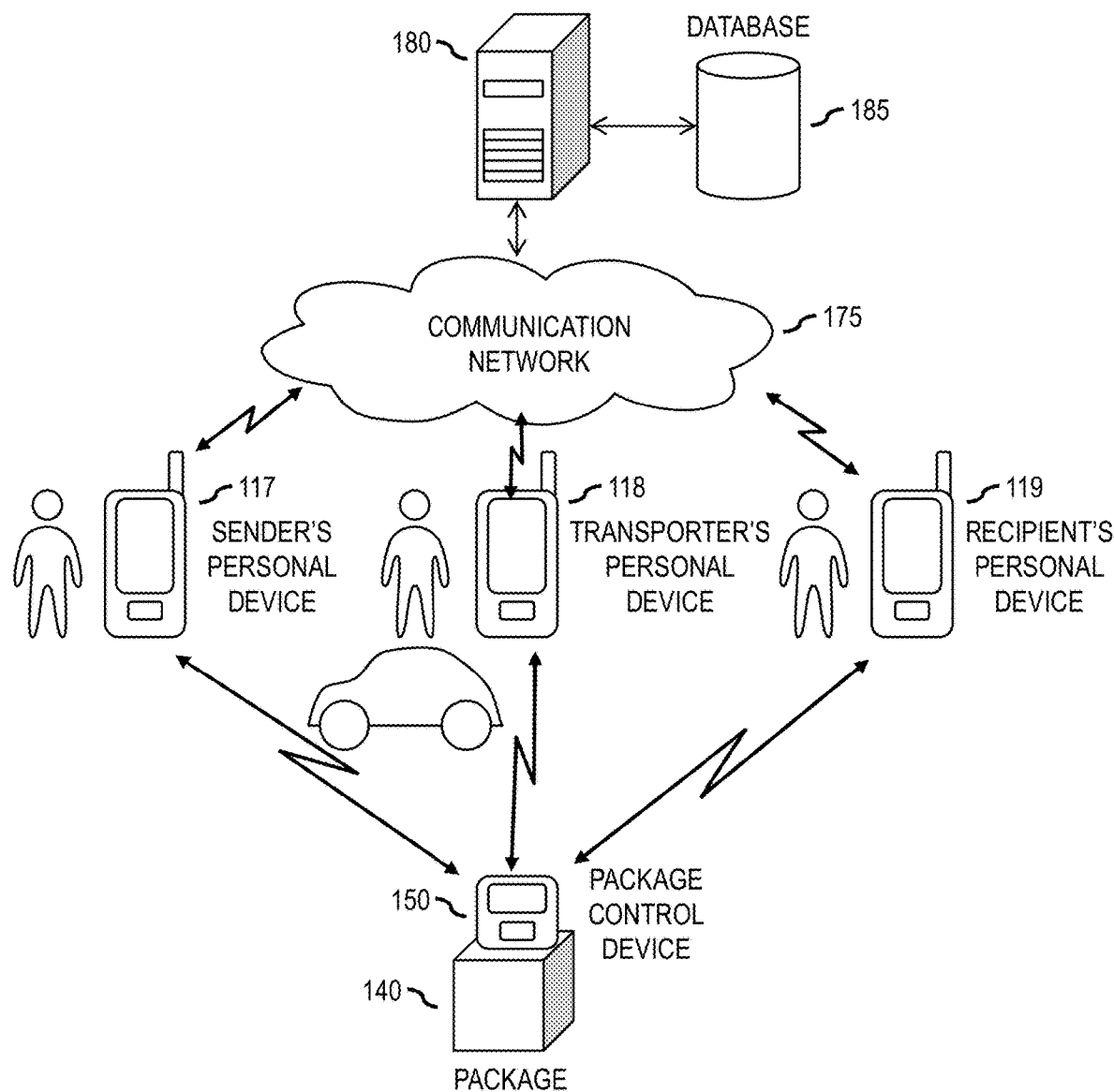
FIG. 1A shows an illustrative goods transport system and method, wherein a package control device controls handover of a package between individuals without a need for communication with a server during a transport session.

A system and method for managing the transport and storage of goods by individual users are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Generally, the system and method for managing the transportation and storage of goods, and the like, allows senders, transporters, recipients, and the like, access via personal devices configured for arranging and controlling the quality of transportation services between each other. The system and method can include a package control device configured to authorize and control access to a package and its contents, register users who are in custody of the package at different times, and/or communicates instructions with the users during the transportation and storage process. The system and method also can include a storage facility with which the users can improve the availability of the transportation or storage service, or align interactions with their own schedules, and the like.

The present invention includes recognition of the competitive disadvantages of delivery services dependent on logistics networks, compared to the low marginal operating expenditures of private vehicles driven by the consumers themselves when transporting goods from retail distribution points to the final places of consumption at private homes. The present invention provides a solution by allowing a delivery service to benefit from the same low marginal operating expenditures of private vehicles driven by the consumers themselves.

The present invention also includes recognition of the structural dependency in developed economies on the use of private vehicles in visiting car accessible businesses, such as hypermarkets, and the like, that have driven competition out of business and now represent 50% of sales in many developed economies. With road transportation over 95% dependent on oil as its primary source of energy, and the price of oil rising faster than overall inflation, such structural dependency reduces the purchasing power of consumers available for other consumption. The present invention provides a solution by significantly increasing the fuel efficiency of private vehicles through the transport of goods alongside the primary purpose of driving.

The present invention also includes recognition of the poor accessibility of hypermarkets lacking vehicles for transportation of goods, and the time consumed at the expense of leisure and family for those who drive cars in congested streets to shop in distant large scale retail hubs. Whereas online orders and home deliveries allow users to spend time only to select goods, the users still have to pay for the collection and delivery costs directly or as hidden costs. The present invention provides a solution by allowing another consumer to transport the purchases at a lower cost or even free of charge.

The present invention also includes recognition of the need for expensive storage space to store the often infrequently used consumer goods and appliances bought by consumers, and the time consumed to locate such storage places. Storage outside a home is limited by costs, inconvenient storage unit sizes, and poor accessibility. Throwing away goods and buying replacements whenever a need arises is also expensive. Vacating storage space by recycling goods through online second-hand markets involves delivery efforts and costs. The present invention provides a solution by allowing consumer to recycle goods with the help of another consumer at an affordable cost relative to the price of the goods.

The present invention also includes recognition that passengers who share a ride with someone can evaluate, judge and communicate how well the transportation service was provided, but a transported package cannot. Still, the higher efficiency and shared costs of ride sharing can be valuable for the transportation of goods. The present invention provides a solution by allowing users or package control devices to act on and perform similar management roles as the ride sharing passenger.

The adoption of ride sharing has shown that individuals are willing to provide personal transportation services to each other. The adoption of home delivery services has shown that individuals are willing to offload transportation of everyday goods to others. The adoption of second-hand goods recycling has shown that individuals are willing to offload storage of everyday goods outside of their homes. However, the present invention also includes recognition that the transportation and storage of goods by individuals requires a significant effort to manage the associated logistics, costs and uncertainties. The present invention provides a solution to reduce such efforts, and provide convenience to the users.

Referring now to the drawings, wherein like reference numerals designate identical or corresponding parts throughout the several views, and more particularly to FIG. 1A thereof, there is illustrated a goods transport system and method 100, wherein a package control device controls handover of a package between individuals without a need for communication with a server during a transport session. In FIG. 1A, generally, the goods transport system and method provide for managed delivery of packages by or between users of the system. The system and method can include, for example, a server 180, a database 185, personal devices 110 shown in FIG. 1B of the users of the system and method (e.g., personal device 117 of a sender, personal device 118 of a transporter, personal device 119 of a recipient, etc.) communicating with the server 180 over communications network 175 (e.g., a wired and/or wireless communications network), and a package control device (PCD) 150 attached to a package 140.

Figure 1B:
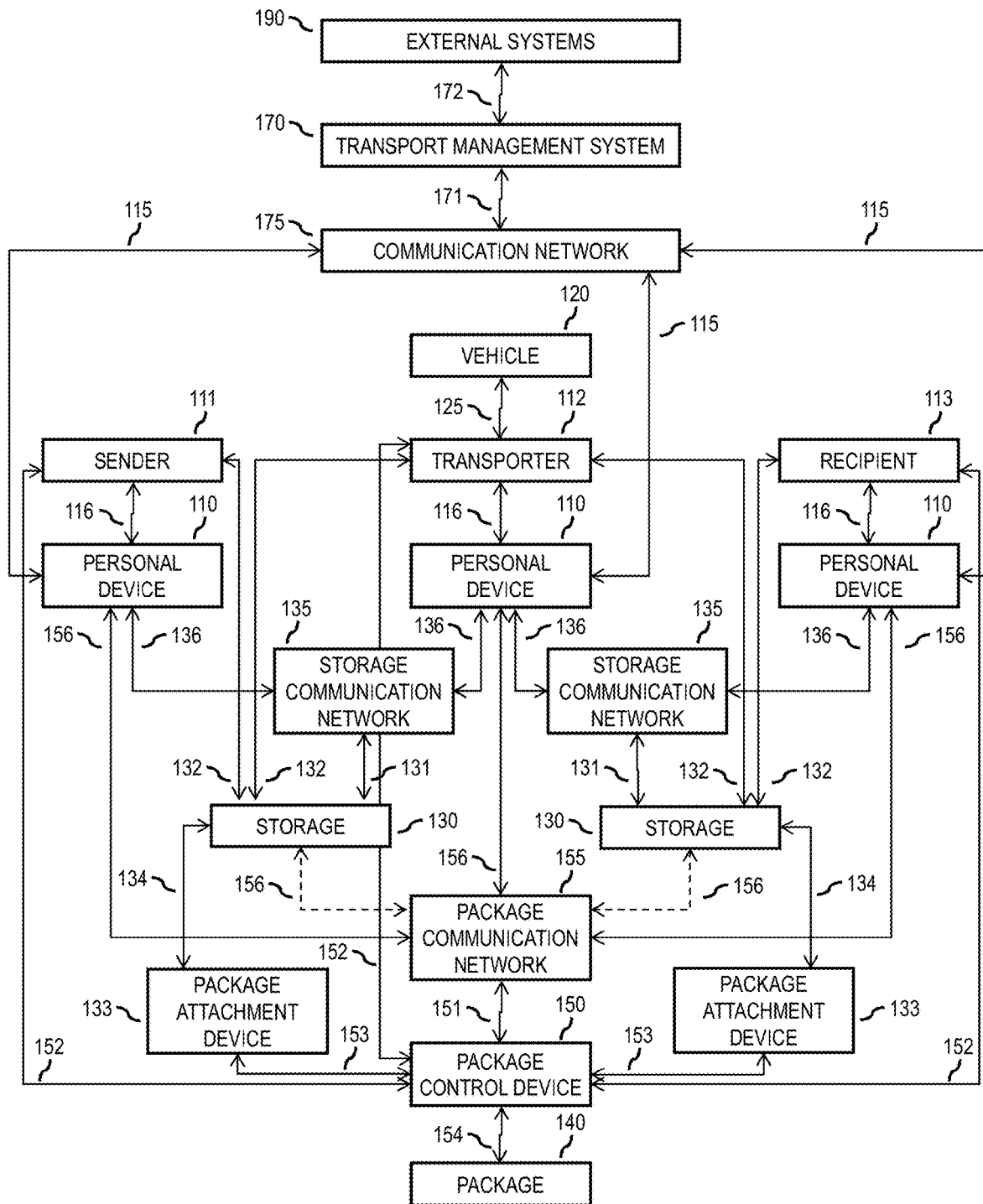
FIG. 1B shows an illustrative goods transport and storage system and method, wherein a package control device controls handover of a package between individuals or a storage facility without a need for communication with a server during a transport and/or storage session.

FIG. 1B shows an illustrative goods transport and storage system and method 101, wherein a package control device controls handover of a package between individuals or a storage facility without a need for communication with a server during a transport and/or storage session. In FIG. 1B, generally, the goods transport and storage system and method provides for managed delivery or storage of packages 140 by or between users of the system and method. The system and method can include, for example, the personal devices 110 of the users of the system and method, a vehicle 120, the package control device (PCD) 150, a package attachment device (PAD) 133, a storage device 130, a transport management system (TMS) 170, and external systems 190.

The TMS 170 manages transport and/or storage related operations and transactions by or between the users of the system and method. The TMS 170 can include, for example, the server 180, the database 185 for storing users and operations data, a log processing system, a transaction management system, an auction system, a payment system, a reputation system, a routing system, a scheduling system, a virtual representation system and/or a quality assessment system, and the like. Such functions also can be operated in and accessed from the external systems 190 over a suitable interface 172. The TMS 170 can communicate with other devices in the system over communication interface 171 via the communications network 175.

The personal devices 110 can be configured to provide access to the system and method by individual users and allow the users to conveniently and securely perform operations with the packages 140. The personal devices 110 can include, for example, a processor, a data storage device, a user interface, and/or a security mechanisms, and the like. The personal devices 110 can access the TMS 170 over interface 115 via the communications network 175, can access a storage device 130 over interface 136 via a storage communications network 135, and can access the PCD 150 over interface 156 via a package communications network 155.

The personal devices 110 can be operated by a sender 111, a transporter 112, a recipient 113, and/or other individuals interacting with the system and method. The sender 112 and/or recipient 113 can alternatively be a company or other suitable entity, in which case the personal devices 110 can represent a system operated by a user belonging to such an entity. The transporter 112 can carry the package 140 on their person or employ the vehicle 120 and a vehicle user interface 125 to transport the package 140. Users of the systems and methods of FIGS. 1A-1B who interact with the package 140, such as the sender 111, the transporter 112 and/or the recipient 113, can be commonly referred to as operators of the package 140.

The storage device 130 provides a convenient and secure facility for storing the package 140 between the scheduled drop-off of its previous custodian (e.g., the transporter 112), and the scheduled pick-up of its next custodian (e.g., another transporter 112 or the recipient 113). The storage device 130 can include, for example, security mechanisms, such as wires, doors and/or locks and/or cameras, identification mechanisms, such as labels and/or colors, package handling mechanisms, such as shelves and/or rails, user interfaces, and/or storage capacity measuring mechanisms, and the like.

The storage device 130 can be configure to be at a fixed location, or can be mobile on a vehicle (e.g., in the vehicle 120) or on a transportable platform, such as a sea, air, train, and the like, container, and the like. The storage device 130 can further be configured to be publicly accessible to a wide group of users, or to be privately accessible to only a set of designated users. The storage device 130 can be operated by the users of the system and method, and/or can be operated by a designated storage operator, and the like. For example, a mobile storage also can be configured as a driverless vehicle, wherein the sender 111 can drop off the package 140, which can then be picked up directly by the recipient 113 without the participation of the transporter 112.

The package attachment device (PAD) 133 can be configured to secure the package 140 to a suitable location while the package 140 is in the storage device 130 or in the vehicle 120. The PAD 133 can be connected to the storage device 130 with an interface 134. The PAD 133 can include, for example, a controlled attachment and detachment mechanism, a user interface, and/or be a part of the PCD 150 access interface 156.

The package control device (PCD) 150 can control access to the package 140 and its contents by users of the system and method, and can store data regarding the status of the package 140 and/or the operations performed with the package 140. The PCD 150 can include, for example, a processor, a data storage device, a security mechanism, sensor devices, and/or identification mechanisms, and the like. The PCD 150 can be connected to the package 140 with the PCD package interface 154, and to the package attachment device 133 with the PCD attachment device interface 153. The package communications network 155 provides access to the PCD communication interface 151 of the PCD 150 from devices in the system and method. Users of the system and method also can access the PCD 150 directly over the user interface 152.

Accordingly, the devices and subsystems of the goods transport system systems and methods of the present invention can include, for example, any suitable servers, workstations, personal computers (PCs), laptop computers, PDAs, Internet appliances, modems, handheld devices, telephones, wireless devices, other devices, etc., capable of performing the processes of the embodiments of the present invention. The devices and subsystems can communicate with each other using any suitable protocol and can be implemented using one or more devices or computer systems such as the computer system 800 of FIG. 8, for example. One or more interface mechanisms can be used in the systems and methods of the present invention including, for example, Internet access, telecommunications in any form (e.g., voice, modem, etc.), wireless communications media, a combination thereof, and the like.

Accordingly, the TMS 170 can be implemented, for example, as a centralized server, a set of distributed servers, a set of distributed peer devices, such as personal devices of the users of systems and methods of the present invention, a combination thereof, and the like. The personal devices 110 can be implemented, for example, as a mobile phone, a tablet, a PDA, a laptop, a personal computer, a pager, a media player, a watch, a user interface on a multi-user computing device, a Bluetooth device, a near field communications (NFC) device, a magnetic card, such as a loyalty card, as a shared device that is temporarily configured for the individual user, such as a mobile device operated by another user, a PC where the user has logged in, a logistics management system operated by a designated user, a package storage unit with which the user has authenticated themself, a combination thereof, such as a mobile phone and an NFC device, and the like. The PCD 150 can be implemented, for example, as a computing device, a sensor device, a Bluetooth device, an NFC device, an RFID label, a barcode, a QR-code, a printed or written label including alphanumeric characters and/or symbols and/or colors, a combination thereof, and the like.

Accordingly, the storage device 130 can be implemented, for example, as a designated area, a set of shelves, a rack, a cabinet, a locker, a vehicle trunk, a vehicle, a shed, a warehouse, a combination thereof, and the like. The PAD 133 can be implemented, for example, as a compartment with a door, a plug-in connector with a wire, a wire with a padlock, a strap, an antenna capable of detecting the PCD 150, a sensor capable of detecting the PCD 150, and/or a communication interface capable of detecting the PCD 150. The vehicle 120 can be implemented, for example, as a truck, a van, a bus, a car, a motorcycle, a scooter, a bicycle, a personal transporter, a transport animal, a boat, a sleigh, a trolley, and/or a carrying tool on a person, such as a backpack, and/or a bar across the shoulders with ropes to attach to packages on both sides of the user, and the like. The vehicle 120 can include one or more of the PADs 133 to attach the PCDs 150 to the vehicle 120.

Accordingly, the communications network 135 connecting the storage device 130 with the personal devices 110 and the PCDs 150, the communications network 155 connecting the PCDs 150 with the personal devices 110, the communications network 175 connecting the TMS 170 with the personal devices 110 and any other suitably employed communications networks and/or links can include, for example, one or more wireless communications networks, cellular communications networks, 3G or 4G communications networks, Public Switched Telephone Networks (PSTNs), Packet Data Networks (PDNs), the Internet, intranets, ad-hoc networks, short range connectivity networks, such as Bluetooth or ZigBee networks, proximity connections, such as NFC and/or RFID and/or infrared, a combination thereof, and the like. In addition, the communications networks 135, 155 and/or 175 can be the same and/or different networks, and can connect other elements of the systems and methods of the present invention, as will be appreciated by those skilled in the relevant art(s).

Figure 2:
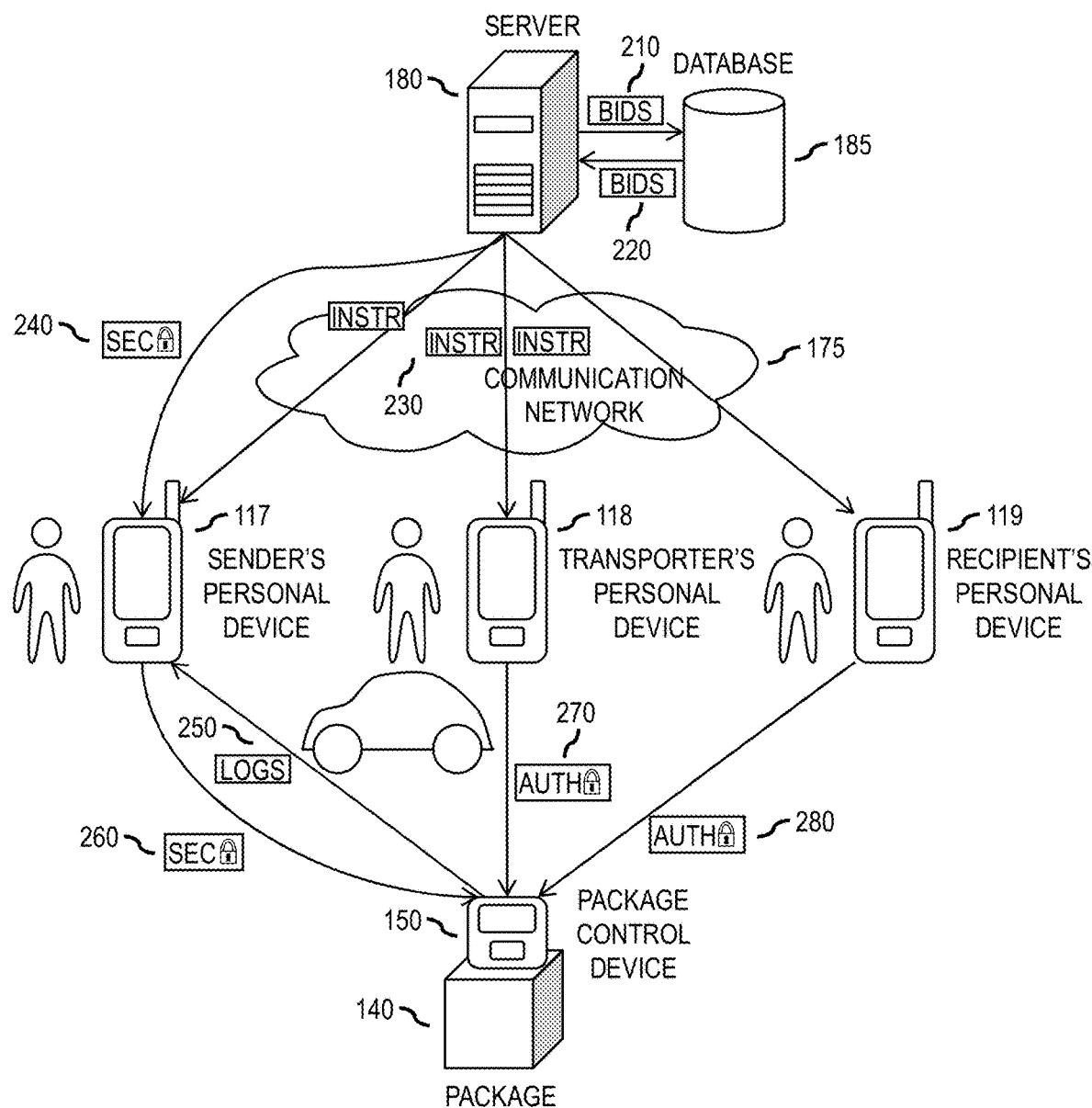
FIG. 2 shows illustrative flowchart of processes performed by a goods transport system and method in an exemplary goods transport procedure.

FIG. 2 shows illustrative flowchart 200 of processes performed by a goods transport system and method in an exemplary goods transport procedure. For example, FIG. 2 depicts processes performed by the system and method 100 of FIG. 1A in an exemplary goods transport procedure. Accordingly, in step 210, the server 180 stores into the database 185 package transport requests, for example, including pick-up and drop-off information, and the like, the sender's and recipient's preferences, and the like, package transport offers, for example, including planned transport information, and the like, and transporter's preferences, and the like.

In step 220, the server 180 retrieves transport requests and transport offers from the database 185, and identifies a match between a specific transport request and transport offer. In step 230, the server 180 communicates to the sender's device 117, to the transporter's device 118, and the recipient's device 119, transport instructions, for example, including responsibilities in the transport and/or storage process, transport conditions, and/or planned pick-up and drop-off information, and the like.

In step 240, the server 180 sends the transport instructions and security information to the sender's device 117. In step 250, the sender's device 117 retrieves from the PCD 150 any suitable data stored in the PCD 150 related to previous transport operations. In step 260, the sender's device 117 sends to the PCD 150 the new transport instructions. In step 270, the PCD 150 attached to the package 140 authenticates and authorizes the transporter to pick up the package 140 by communicating security information with the transporter's device 118, and stores pick-up event data for uploading to the server 180. In step 280, the PCD 150 attached to the package 140 authenticates and authorizes the recipient to pick up the package 140 by communicating security information with the recipient's device 118, and stores pick-up event data for uploading to the server 180.

Accordingly, in FIG. 2, steps 260, 270 and 280 can include the personal device 110 causing planned transport and/or storage operations data to be stored in the PCD 150 associated with the package 140; the PCD 150 identifying the operator of the package 140 by biometric identification data, and the like, and/or the personal device 110 of the operator of the package 140 communicating identification data to the PCD 150; the PCD 150 determining how the identification data compares to the configured transport and/or storage operations data; and the PCD 150 causing the operator of the package 140 to have access to operate the package 140.

Such processing can be implemented, for example, by a smart phone writing transport instructions to memory in the PCD over an NFC communication interface; a smart phone communicating an identifier associated with the operator to the PCD over an NFC communication interface; the PCD identifying a match of the communicated identifier with the identifier stored in the transport instructions in the memory; and the PCD deactivating its theft alarm. This can also be implemented, for example, by a first smart phone reading an NFC key attached to the package by a package control application that associates the NFC key code with a planned package delivery; a second smart phone reading the NFC key attached to the package and sending the NFC key code and an identifier of its user to the package control application in the first smart phone over the Internet; the package control application in the first smart phone using the received NFC key code to associate the second user with the package delivery; and the package control application in the first smart phone sending a response to the second smart phone to inform the second user that they are permitted to pick up the package. This can also be implemented, for example, by a service where a first user has logged in from a computer instructing the first user to write a label for the package; the computer from which a second user has logged in the service sending the user's NFC key information to an NFC access control device in a storage facility; the second user providing his NFC key to be read by the NFC access control device; and the NFC access control device opening the storage compartment that was assigned to the package on which a camera accessed by the storage facility detected the label written by the first user.

Accordingly, in FIG. 2, steps 270 and 280 can include a security function in the PCD 150 or the personal device 110; the PCD 150 determining the transport and/or storage operation performed by the operator of the package 140; the PCD 150 determining the actions of the security function in response to the attempted operation by the operator of the package 140; and the PCD 150 causing the actions to be executed by the security function. This can be implemented, for example, by the PCD using an acceleration sensor to detect an attempt to move the package while in storage; the PCD being in an unauthorized state and starting a timer permitting five seconds of movement during which the PCD can warn the operator; and the PCD activating an audio alarm if the operator has not authenticated himself and the movement continues.

Accordingly, in FIG. 2, steps 270 and 280 can include a user interface function in the PCD 150 or the personal device 110; the PCD 150 using input from the user interface function in determining the transport and/or storage operation performed by the operator of the package 140; the PCD 150 determining the output of the user interface function in response to the operation performed by the operator of the package 140; and the PCD 150 causing the output to be executed by the user interface function. This can be implemented, for example, by the PCD detecting the pressing of an "Operation ready" button in the PCD; the PCD using its current state to make a lookup that returns a function call that activates a green LED and a function call that sends over a communication interface to the personal device the message "Operator liability ended"; and the PCD executing both function calls.

Accordingly, in FIG. 2, steps 260, 270, 280 and 220 can include a logging function in the PCD 150 and a compliance enforcement function in the server 180; the PCD 150 retrieving log data from the logging function and communicating it to the personal device 110; the personal device 110 communicating the log data the server 180; the server 180 determining how the log data corresponds to the conditions in the transport and/or storage operations data; the server 180 determining the enforcement action in response to the compliance with the conditions; and the server 180 causing the enforcement action to be executed by the compliance enforcement function. This can be implemented, for example, by the PCD storing time stamps of the performed operations in its memory and allowing them to be read by the smart phone of the sender over an NFC interface; the server identifying a difference between the instructed deadline of a drop-off by a transporter stored in the database record for the transport and the timestamp communicated over the internet by the smart phone of the sender on behalf of the PCD; adjusting the reliability score of the non-compliant transporter lower; and filtering out in its matching function subsequent transport requests that require a higher reliability score than the adjusted score.

Accordingly, in FIG. 2, steps 260, 270 and 280 can include a first personal device 110 configuring authorization data associated with the planned transport and/or storage operations data in the PCD 150; the PCD 150 communicating the authorization data and the planned transport and/or storage operations data to a second personal device 110; the second personal device 110 determining how the authorization data corresponds to previously stored authorization data; and the second personal device 110 configuring the planned transport and/or storage operations data. This can be implemented, for example, by the smart phone of the sender writing a message authentication code generated by the server to memory in the PCD over an NFC interface; the smart phone of the transporter reading an update to the drop-off point and the message authentication code from the memory of the PCD over an NFC interface; the smart phone of the transporter generating the same message authentication code from the update to the drop-off point using the server's key; and the smart phone of the transporter replacing the drop-off point with the updated point.

Accordingly, in FIG. 2, at steps 210 and 220, the management of transport requests and transport offers with users can include a graphical user interface in a personal device 110 or a server determining user interface representations of a package 140 and users involved in the transport of the package 140; a user creating a transport request or a transport offer by moving in the user interface the representation of the package 140 from a first location in a data structure to a second location in a data structure; and a personal device 110 or a server communicating to the user the status of the transport by causing a change in the representation of a package 140 or a user in the user interface. This can be implemented, for example, by a server mapping goods, packages, storages and users into files and folders in a file system, such as in the Dropbox or Google Drive file sharing service; a sender creating a transport request by moving files representing goods into a folder representing a package, and moving the package folder into a folder representing the destination storage of the recipient; a transporter creating a transport offer by moving a folder representing an unknown package into a folder representing a driving route; the server showing a progress indicator icon on the package folder icon while the package is not in the destination location; and the server showing a synchronization complete indicator icon on the package folder icon when the package has arrived at the destination storage of the recipient.

Figure 3A:
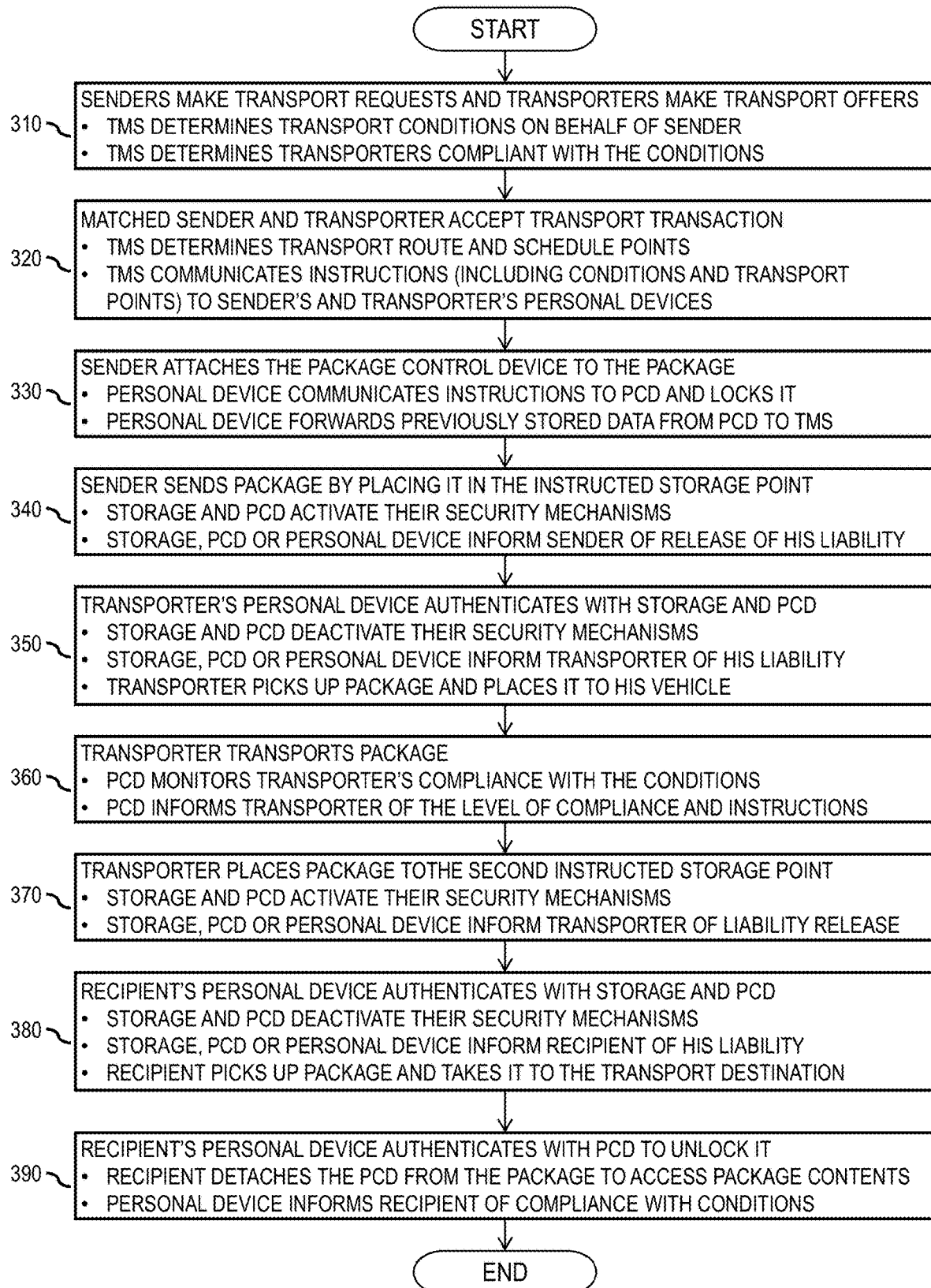
FIG. 3A shows an illustrative flowchart of processes performed by a goods transport and storage system and method in an exemplary goods transport procedure.

FIG. 3A shows an illustrative flowchart of processes performed by a goods transport and storage system and method in an exemplary goods transport procedure. For example, FIG. 3A is a flowchart depicting processes performed by the system and method 101 of FIG. 1B in an exemplary goods transport procedure. In step 310, after senders 111 have made transport requests, and transporters 112 have made transport offers using their personal devices 110, the TMS 170 determines transport and/or storage conditions on behalf of a specific sender 111, and then determines the transporters compliance with the conditions. The transport and/or storage conditions can include, for example, a condition on the timing of a transport operation, and/or a condition on an environmental variable, such as temperature of the package 140.

In step 320, after the sender 111 and a specific transporter 112 and/or transporters 112 matched by the TMS 170 have accepted the transport transaction, the TMS 170 determines the transport and/or storage route points, and time windows (e.g., wherein the package 140 needs to be and when), and communicates the transport instructions and transport conditions (e.g., which can include transport and/or storage conditions and transport and/or storage route points and time windows) to the sender's personal device 117 and the transporter's personal device 118.

In step 330, after the sender 111 has attached the PCD 150 to the package 140, the sender's personal device 117 communicates transport instructions to the PCD 150, which then locks itself. The PCD 150 then communicates its previously stored package operations and status data to the sender's personal device 117, which communicates the operations and status data to the TMS 170.

In step 340, after the sender 111 has carried the package 140 and placed it in the instructed storage location of the storage device 130, the storage device 130 and the PCD 150 activate their security mechanisms. One or more of the storage device 130, the PCD 150 and/or the sender's personal device 117 then communicate to the sender 111 (and e.g., optionally to the TMS 170) that their custody of and liability for the package 140 has been released.

In step 350, after the transporter's personal device 118 has authenticated the transporter 112 with the storage device 130, and the PCD 150, their corresponding security mechanisms are deactivate. One or more of the storage device 130, the PCD 150 and/or transporter's personal device 118 then communicate to the transporter 112 (and e.g., optionally to the TMS 170) that they are now in custody of and have liability for the package 140. The transporter 112 picks up the package 140 and places it to their vehicle 120.

In step 360, while the transporter 112 transports the package 140, the PCD 150 determines the transporter's compliance with the transport instructions, communicates to the transporter the level of compliance, and communicates to the transporter instructions that, when performed, adjust the level of compliance. In step 370, after the transporter 112 has transported the package 140 and placed it in the instructed second storage device 130, the second storage device 130 and the PCD 150 activate their security mechanisms. One or more of the second storage device 130, the PCD 150 or the transporter's personal device 118 then communicate to the transporter 112 (and e.g., optionally to the TMS 170) that their custody of and liability for the package 140 has been released.

In step 380, after the recipient's personal device 119 has authenticated the recipient 113 with the storage device 130 and the PCD 150, the corresponding security mechanisms are deactivate. One or more of the storage device 130, the PCD 150 and/or the recipient's personal device 119 then communicate to the recipient 113 (and e.g., optionally to the TMS 170) that they now are in custody of and have liability for the package 140. The recipient 113 picks up the package 140 and takes it to the transport destination.

In step 390, after the recipient's personal device 119 has authenticated the recipient 113 with the PCD 150, and the PCD 150 has authorized the recipient 113, the PCD 150 unlocks its access control. The recipient 113 detaches the PCD 150 from the package 140 to access the package contents, and the recipient's personal device 119 communicates to the recipient 113 the level of compliance of the completed transport with the transport conditions.

Accordingly, in FIG. 3A, steps 310 and 320 can include the determination of transport conditions and matching of transport offers and requests in one or more of the personal devices 110 of the sender 111, transporter 112 or recipient 113 in addition to or instead of the TMS 170 and can be implemented, for example, by the transporter's personal device 118 sending a transport offer to a list of personal devices 110 known to be operated by senders 111, and a sender's personal device 117 matching the offer with its transport request and sending a response including the transport transaction to the transporter's personal device 118. This can also be implemented, for example, by the sender's personal device 117 sending a transport request to a list of personal devices 110 known to be operated by transporters 112, and a transporter's personal device 118 matching the request with its transport offer and sending a response including the transport transaction to the sender's personal device 117.

Accordingly, in FIG. 3A, at step 310, when determining transport conditions the determination can include modifications based on the characteristics of the package 140, transport route or storage facility 130 and can be implemented, for example, by omitting temperature conditions if the package includes refrigeration functionality and the storage facility provides external electricity supply for the packages, or by more stringent acceleration conditions if log data from previous transport operations along the transport route have identified the road to be bumpy, or adding water resistance conditions if a weather forecast for the area of the storage along the transport route indicates rain. The transport conditions can include conditions based on the contents, the transport requestor, and the package owner.

Accordingly, in FIG. 3A, at step 310, when determining transporters 112 compliant with the conditions the determination can include an estimate of their probability to achieve compliance and can be implemented, for example, as a ratio of their performance in past transport and/or storage operations to the conditions for the same operations, or as a similar ratio but only for past transport and/or storage operations that are similar to the currently planned one.

Accordingly, in FIG. 3A, at step 310, when determining transporters 112 compliant with the transport conditions the determination can also can include modifications of the conditions based on the availability of compliant transporters 112 and can be implemented, for example, with a timer that measures time until the scheduled start of the transport, and the TMS relaxing on behalf of the sender conditions, such as the employed reputation when the timer exceeds a threshold.

Accordingly, in FIG. 3A, at step 310, the making of transport requests or transport offers can include determination of potential transporters 112 or recipients 113 from whom the requests or offers can be solicited and can be implemented, for example, by a server of a parcel delivery service comparing routes from a parcel distribution point, such as a post office or an automated parcel storage to the addresses of different parcel recipients with parcels in the same distribution point at the same time, and sending with SMS solicitations of transport requests or transport offers to users with sufficiently matching routes. The making of transport requests or transport offers can include determination of potential time windows with minimal conflicts with the other scheduled activities of the transport operations by senders 111, transporters 112 or recipients 113 and can be implemented, for example, by importing calendar availability data from the user's account in external calendar services, such as Google Calendar or from the user's account in social media services, such as Facebook. The making of transport requests or transport offers by importing data from the user's account in external services can further can include determination of potential transporters 112 contactable through the first user from whom the transport offers can be solicited and can be implemented, for example, by sending to the first user solicitation of transport offers to be forwarded to the user's contacts in the external service who are joining the user in the scheduled activity.

Accordingly, in FIG. 3A, at step 310, the making of transport requests or transport offers can include determination of transport request or transport offer conditions and data by importing them from a third party and can be implemented, for example, by the user taking a picture of a QR-code that supplies some or all of the information employed in a transport request for the associated goods or package.

Accordingly, in FIG. 3A, at step 310, the making of transport requests or transport offers can include a determination of guarantee available from the user making the transport request or transport offer and can be implemented, for example, by calculating a certain percentage of the money or loyalty points stored in the user's customer account to be used as deposit and reserving that to the transport until the transport is confirmed completed, and comparing the total sum of all deposits allocated by the user for different transports to the total money or loyalty points stored in the user's customer account to be used as deposit, and blocking the transport request or transport offer by the user if the total sum of deposits exceeds the total available for deposits. The determination of deposit can further include the determination of guarantee available from other users who have made their guarantees available to the user. This can be implemented, for example, by a group of users pooling their deposits by authorizing the allocation of their deposits by another user in the group, and blocking the transport request or transport offer by the user if the total sum of deposits allocated by all users in the group exceeds the total available for deposits by all users in the group.

The determination of deposit can further include the determination of overlapping deposit allocations to prevent dual counting of deposits between a first group of users and a second group of users; a user allowing a guarantee provided by him to be used by other users in the first group and in the second group; the start of a service transaction by a second user in the first group causing the guarantee to be prevented from use by a third user in the second group; and the end of the service transaction by the second user in the first group causing the guarantee to be allowed for use by a third user in the second group. This can be implemented, for example, by users A, B and C pooling 100 dollars each to mutual guarantees and users C, D and E pooling 100 dollars each to mutual guarantees; user A committing to a transport requiring all 300 dollars of guarantees from users A, B and C and preventing users D and E from use of user C's 100 dollars of guarantees; and user A completing the transport releasing user C's 100 dollars of guarantees for use in guarantees by users D or E. The determination of overlapping deposit allocations can further include determination of overlaps for groups of users with partially overlapping membership and can be implemented, for example, by calculating allocations and deposit availability for all group in which the user is a member, and selecting to allocate the deposit from the group with the most deposits available for allocation.

Accordingly, in FIG. 3A, at step 310, when determining transporters compliant with the transport conditions the determination can include determination of the type of package 140 or the specific package 140 used in the transport and can be implemented, for example, as a query from a list of packages returning packages located in the proximity of the driver, the transport starting point or the first drop-off point, or as a query from a list of packages returning packages with a refrigeration functionality.

Accordingly, in FIG. 3A, at step 310, when determining transporters compliant with the transport conditions the determination can include determination of available goods transport capacity in a transport vehicle, including reception of a signal in a sensor in the transport vehicle; and determination of the available goods transport capacity in the transport vehicle based on the received signal. This can be implemented, for example, by a radio or ultrasound or pressure sensor in the trunk of the transporter's vehicle receiving a signal (e.g., sent by a radar or ultrasound signal source synchronized with the sensor), and an analysis functionality in the vehicle or the personal device or the server comparing the received signal to signals associated with different amounts of goods stored in the trunk as indicated by the transport requests associated with the goods.

Accordingly, in FIG. 3A, at step 320, when determining transport instructions, the determination can further include determination of identification data of a package 140, including determination of identifiers on packages present in the proximity of the same storage locations or transport vehicles at the same time as the package; determination of an identifier different from those in other packages; and communication of the identifier to the user. This can be implemented, for example, as a query from a database of identifiers printed or written on the surfaces of other packages present in the same storage locations or transport vehicles at the same time as the package, and determination of an identifier different from those; and communicating that to the sender to be written on the package. This can also be implemented, for example, as a query from a database of PCDs the visual appearance of the PCDs that are present in the sender's location, and instructing the sender to select for attachment to the package a PCD that is visually different from the PCDs used in other transport procedures that will be in the same storage locations or transport vehicles at the same time as the PCD.

Accordingly, in FIG. 3A, at step 320, when determining transport instructions, the determination can further include determination of a storage location in the storage device 130 based on the scheduling of drop-off of the package compared to other packages, or the scheduling of pick-up of the package compared to other packages, or the identifiers of the package compared to other packages and can be implemented, for example, by calculating the total number of storage movements for all combinations of package drop-offs and package pick-ups in storage locations of a storage where storage locations are sequentially accessed and then selecting the storage location where the total number of storage movements is lowest, or as a query from a database of identifiers on other packages present in the same storage at the same time as the package, and selecting a storage location where none of the identifiers in the neighboring storage locations is the same as the identifier of the package (in the PCD). This allows reduction of collisions when short and easy to remember package identifiers are reused even in the same storage or vehicle.

Accordingly, in FIG. 3A, at step 320, the determination of acceptance of a transport transaction by a transporter 112 can include causing a different transaction or function to be activated. This method for activation of a transaction between entities that are the end points of a transport procedure includes determining the transport procedure that is a condition for the transaction; determining the commitment of transporters to execute the transport procedure; and causing the transaction to be activated. This be implemented, for example, by a sender putting goods on sale in an online auction or classifieds service and the recipient purchasing the goods on the condition that he can arrange a transport for them; the service linking a transport request to the purchase; the recipient configuring the transport request; and the transporter's acceptance of a transport request executing the conditional purchase agreement in the online auction or classifieds service.

Accordingly, in FIG. 3A, steps 320 and 350 can include an authorized personal device 110 configuring transport instructions and authorization data associated with the transport instructions in the PCD 150 or the storage device 130. This can be implemented, for example, by the smart phone of the transporter writing a new transport destination, a transporter authorization or a recipient authorization for a package and a message authentication code generated by the server to the memory in the storage over an NFC interface; and the storage generating the same message authentication code from the updated transport instructions using the server's key to confirm the authorization of the changes; and the storage configuring the new transport instructions to the PCD. This allows the use of the storage or the PCD to control the rental of goods to users that were unknown at the time when the goods were placed in the storage.

Accordingly, in FIG. 3A, at step 330, the transport instructions can include authorization data for each specific operation performed with the package 140 or the PCD 150 and can be implemented, for example, with role-based access control in the PCD, or with hash chains used in the PCD to derive multiple unique keys for the different operators performing a specific operation. The authorized operations can further include authorization to change the transport instructions in the target device such as a personal device 110 or a storage device 130 and can be implemented, for example, as a message authentication code transmitted with the new transport instructions from the PCD or the personal device of a previous operator to the personal device of a subsequent operator, or to the PCD.

Accordingly, in FIG. 3A, at step 330, the security mechanisms can include an alert feature or an alarm feature and can be implemented, for example, as a visual or audio output in a user interface, or as data communication to a server or to the personal device of a transport stakeholder.

Accordingly, in FIG. 3A, at step 340, the communication of previously stored package operations and status data from the PCD 150 to the sender's personal device 117 and then to the TMS 170 can include a selection of only part of the stored data or of calculations made with the stored data by the PCD 150 or the sender's personal device 117 and can be implemented, for example, by the PCD writing only every tenth measurement data point to the NFC buffer read by the sender's smart phone.

Accordingly, in FIG. 3A, at step 340, the communication of previously stored package operations and status data from the PCD 150 to the sender's personal device 117 and then to the TMS 170 can include a comparison of stored data from a first PCD 150 with stored data of similar type from a second PCD 150 or a personal device 110 or a vehicle 120 if they were in the same vehicle 120 or storage device 130 at the same time as the first PCD 150, and can be implemented, for example, by the TMS making queries in its database of transport transactions to determine devices in the same vehicle or storage, calculating correlations between the measured package operations and status data stored in the database for those devices, and calculating variables that when estimating one device's measurement from another device's measurement. This allows the calibration of sensor data provided by a vehicle or a personal device using sensor data from a PCD, and the possibility of performing measurements by proxy devices even when the PCD does not have a sensor of that type. This also allows the calibration of sensor data in a PCD from higher precision sensor data in another PCD, and the possibility of using lower accuracy components in some of the PCDs.

Accordingly, in FIG. 3A, at steps 350 and 380, the authentication of the operator (e.g., sender 111 or transporter 112 or recipient 113) with the PCD 150 can include the PCD 150 determining a unique signal associated with the operator and can be implemented, for example, by detecting a Bluetooth connection from a smart phone associated with the operator, or by the PCD detecting with a touch screen a movement that forms a unique gesture. The authentication of the operator with the PCD 150 can include the PCD 150 determining the operation occurring between the operator and the package 140 and can be implemented, for example, with the PAD interface device detecting the attachment of a physical connector with the PCD, or with an acceleration sensor detecting movement of the PCD, or with a radio interface such as a Bluetooth device detecting a proximity connection from a smart phone associated with the operator. The determination by the PCD 150 of the operation occurring between the operator and the package 140 can further include determination of the changes in the interfaces of the PCD 150, or determination of the access or operator employed for the operation and can be implemented, for example, by changing the end point of a Bluetooth link by the PCD from the first authorized personal device to the second authorized personal device.

Accordingly, in FIG. 3A, the steps 350 and 380 can further include the server 180, the personal device 110, the storage device 130 or the PCD 150 determining the package 140 based on the planned operation or operator of the package 140 and can be implemented, for example, by communicating only authentication data associated with the operation or operator to all PCDs in the proximity; the PCDs validating the authentication data with their transport instructions; and the PCDs of the relevant package or packages communicating the successful identification to the operator or his smart phone.

Accordingly, in FIG. 3A, steps 370 and 380 can include an authorized personal device 110 configuring authorization data to another personal device 110. This can be implemented, for example, by the smart phone of the transporter first authenticating the recipient, for example, with the recipient writing a password over a user interface of the smart phone and the smart phone comparing it against a message authentication code for the password provided by the server, and then writing an identifier for the recipient to an NFC key over an NFC interface. This allows the use of the personal device of a user, such as a transporter, to distribute personal devices to new users, such as recipients.

Accordingly, in FIG. 3A, the steps 330, 340, 350, 360, 370, 380 or 390 can further include the PCD 150 determining the signals that indicate to the identified operator the package 140 or the occurring transport and/or storage operation and can be implemented, for example, with a LED in the PCD activating in a pattern associated with the operation, or with a LED or an audio device in the PCD activating in a synchronized pattern with a corresponding visual or audio output in the user interface of the operator's smart phone. The determination of the signals can further include determination of a signal that differentiates it from the signals communicated to other users in the same space and can be implemented, for example, by the PCD or the operator's smart phone communicating the selected signal to the storage, and the storage identifying conflicts of the signal with signals communicated previously and associated to other packages operated within or in the proximity of the storage.

Accordingly, in FIG. 3A, the steps 330, 340, 350, 360, 370, 380 or 390 can further include the PCD 150 determining the occurrence of the context in which an operation may take place and can be implemented, for example, by detecting a radio signal such as a signal from an NFC device, or by detecting with sensors or physical interfaces a mechanical interaction with the package or the PCD such as a stationary package being picked up, or by detecting with sensors in the PCD a change in the environment such as a light sensor detecting the opening of a storage door, or by detecting from another device communicating over a communication interface a change in the environment such as a smart phone in the proximity detecting its location from a GPS receiver and communicating that to the PCD. The determination can further include the PCD 150 using the occurrence of the context as one condition in the authorization of the operation. The detection of a mechanical interaction with the package 140 or the PCD 150 can further include a user interface input and can be implemented, for example, as a manual switch or button that a user can operate to communicate a state change in the transport and/or storage process such as the completion of the drop-off procedure, or to communicate his intent to communicate over a radio interface such as an NFC interface, thus allowing the PCD to conserve energy by keeping sensors or radio interfaces in a low-power state outside the time windows when operations take place.

Accordingly, in FIG. 3A, at steps 350, 380 and 390, the authorization of the operator with the PCD 150 can include the PCD 150 allowing the operator to have access to the package 140, package contents, data regarding the package 140, or data regarding the package transport and/or storage and can be implemented, for example, with separate authorization data for each access operation type, or with a single authorization granting access to an associated list of operation types.

Accordingly, in FIG. 3A, at steps 340, 360 and 370, while the package 140 is being transported or stored, the determination of compliance with the transport conditions by the PCD 150 can further include the PCD causing a change in the way that the determination is performed and can be implemented, for example, with a state machine where proximity to a pick-up event time window causes the PCD to switch to a state where it activates a radio interface such as an NFC interface more frequently in order to more quickly detect connection attempts from a smart phone of the operator, or with a state machine where a difference between measured performance and the conditions causes the PCD to switch to a state where it activates the performance monitoring sensors to operate with a higher accuracy. Likewise, while the package 140 is being transported or stored, determination of compliance with the transport conditions by the PCD 150 can further include the PCD 150 causing a change in the transport conditions and can be implemented, for example, with a state machine where a difference between the temperature measured by the PCD and the temperature conditions causes the PCD to switch to a state where the temperature or schedule conditions are relaxed for the remainder of the transport process. Likewise, while the package 140 is being transported or stored, determination of compliance with the transport conditions by the PCD 150 can further include the PCD 150 causing a change in the transport instructions and can be implemented, for example, with a state machine where determined non-compliance with a drop-off time window causes the PCD to switch to a state where it activates the authorization of a different user to pick up and further transport the package in order to execute the further transport faster than by the previously authorized user.

Accordingly, in FIG. 3A, at steps 340, 360 and 370, while the package 140 is being transported or stored, the determination of compliance with the transport conditions by the PCD 150 can further include the PCD 150 or personal device 110 determining the signals that indicate to the operator the level of compliance with the transport conditions and can be implemented, for example, as a green LED in the PCD for full compliance and a red LED for non-compliance, or as an indication of time left until the expiration of the drop-off time window communicated by the PCD to the operator's smart phone over a communication interface followed by the operator's smart phone displaying a countdown sequence to the operator in its user interface. Likewise, the determination of compliance with the transport conditions by the PCD can further include the PCD 150 or personal device 110 determining the signals that indicate to the operator actions that the operator can perform to improve the level of compliance with the transport conditions and can be implemented, for example, as a blinking red LED in the PCD warning the operator that he has to authenticate himself first before picking up the package in order not to activate the alarm function, or as an audio signal in the smart phone instructing the driver to turn on air conditioning. Likewise, the determination of compliance with the transport conditions by the PCD 150 can further include the PCD 150 determining actions that the PCD 150 can perform to improve the level of compliance with the transport conditions and can be implemented, for example, with a state machine where a difference between the temperature measured by the PCD and the temperature conditions causes the PCD to switch on a refrigeration function in the package. Likewise, the determination of compliance with the transport conditions by the PCD 150 or the personal device 110 can further include the PCD 150 or the personal device 110 communicating the non-compliance to the TMS 170 and the TMS 170 determining actions that the to improve the level of compliance with the transport conditions and can be implemented, for example, by the TMS creating a new transport request from a drop-off point along the route of the current operator of the package to the destination location of the package.

Accordingly, in FIG. 3A, at steps 340, 360 and 370, while the package 140 is being transported or stored, the determination of compliance with the transport conditions by the PCD 150 can further include the PCD 150 or personal device 110 determining signals that indicate to the operator an omission of a user input over a user interface and can be implemented, for example, as an audio device in the PCD activating within 30 seconds of a context where there is less than 10 minutes to the scheduled drop-off time, and an acceleration sensor indicates that the package is completely stationary, and the user has not pressed a button to indicate that he has dropped off the package.

Accordingly, in FIG. 3A, at steps 340, 350, 370 and 380, when the package 140 is being transferred between a user and the storage device 130 or between two users, the PCD 150 or the storage device 130 or a user's personal device 110 can communicate to the users (and optionally to the TMS 170) a change in the custody of and liability for the package 140 based on the existence of a network link between the PCD 150 and the user's personal device 110 and can be implemented, for example, by the PCD automatically establishing Bluetooth connections with the smart phones of its operators, and the PCD and the first smart phone detecting the loss of a Bluetooth connection with the smart phone of the first user and the PCD and the second smart phone detecting the establishment of a Bluetooth connection with the smart phone of the second user, and the PCD and the smart phones using this information as a trigger for release of the liability of the first user and the start of the liability of the second user.

Accordingly, in FIG. 3A, step 390 can include a determination of the liability share of each user based on their level of compliance with the transport conditions and can be implemented, for example, by assigning equal amount of liability to all users who were in non-compliance, or by assigning to each user a share of liability relative to their share of the non-compliance such as a 10% share of liability for missing a drop-off deadline by 10 minutes when the total delay for the transport was measured as 100 minutes.

Accordingly, in FIG. 3A, step 390 can include a determination by the TMS 170 of compensation for the transporter 112 from the sender 111, the recipient 113 or a third party and can be implemented, for example, by a server moving money or customer loyalty points from the paying party's account to the transporter's account.

The determination of compensation can further include compensation that is conditional on a match with an end point of the transport transaction. The determination of compensation conditional on a match with an end point can further include the conservation of the condition when the compensation is transferred to another user, wherein a first user making a transaction where a location was an end point causes the first user to receive a voucher for a service with that end point as a condition for the service; the first user transferring the voucher to a second user; and preventing the second user from using the voucher for a service unless the service is provided in the end point or involving end points including the end point indicated in the condition. This can be implemented, for example, by payment of the transport with customer loyalty points that can only be used for paying for transport to or from the retail store from which the completed transport was made, or for paying for purchases in the retail store from which the completed transport was made. This allows the paying party to ensure that the compensation it pays out to its customers is used for subsequent customer visits, even if the subsequently visiting customer is different from the compensated customer.

Accordingly, in FIG. 3A, any of the steps 310 through 390 can further include the display of information to persons in the proximity of a package 140 at various points and times along the route or storage by the PCD 150 or by the PCD 150 further communicating the information to other devices in the system and method 101 or to external devices outside the system and method 101 for the purposes of display to users. This method includes determination of persons in the proximity of the package along the route or storage; determination of information communicated to the persons; communication of the information to a packet control device; and communication of the information from the packet control device to persons in the proximity of the package via a user interface device. This can be implemented by the TMS querying from a list of advertisements, a suitable advertisement associated with a target gender and age group that correlates the most with the genders and age groups of the users operating the package, and communicating in the transport instructions to the PCD that advertisement to be displayed by a display device on the PCD. This can also be implemented, for example, by instructing the selected advertisement to be displayed by any display device that the PCD can connect to during the transport, such as a public information screen.

Figure 3B:
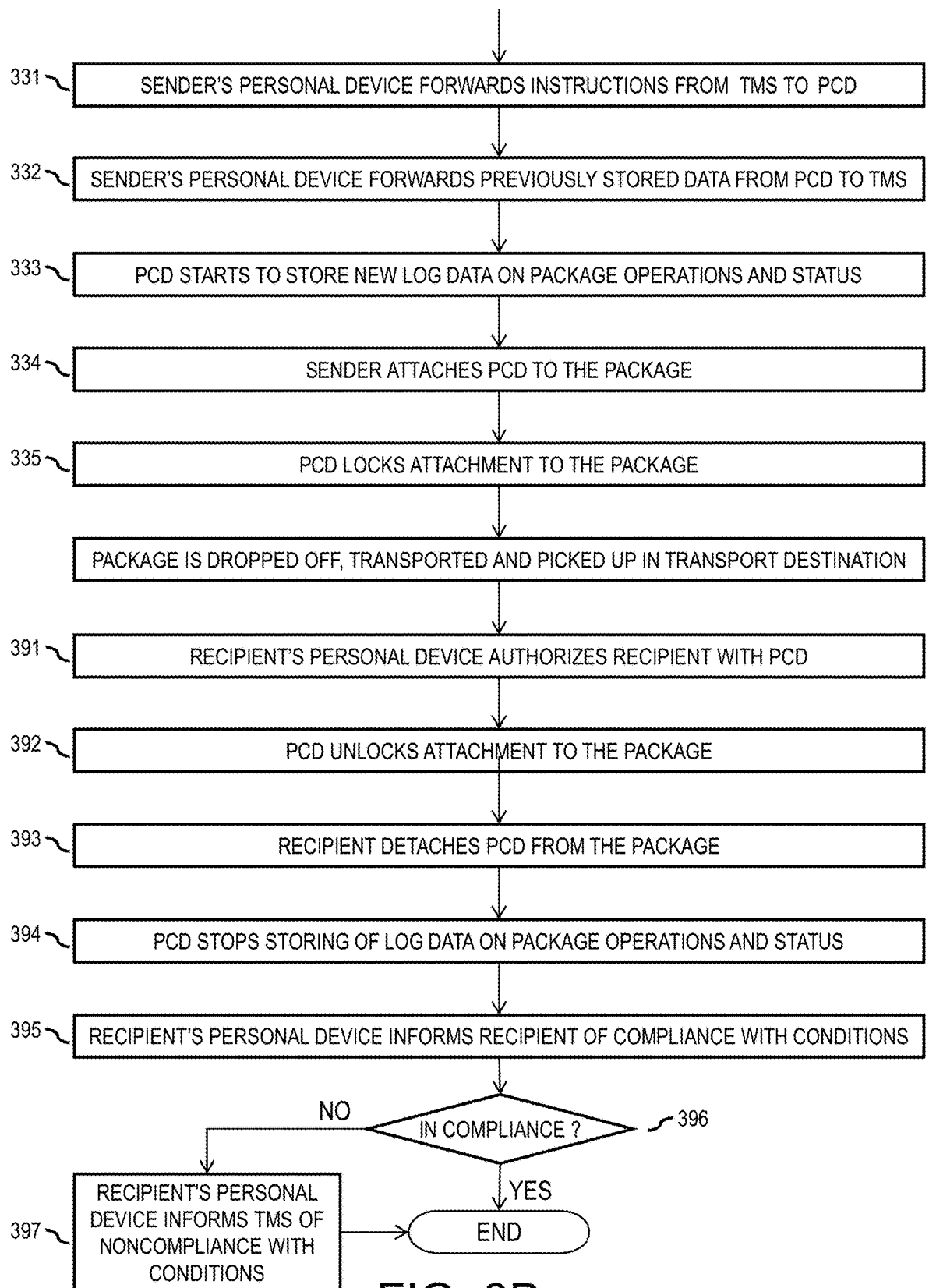
FIG. 3B shows an illustrative flowchart of processes performed by a goods transport and storage system and method in an exemplary procedure of sending and receiving a package.

FIG. 3B shows an illustrative flowchart of processes performed by a goods transport and storage system and method in an exemplary procedure of sending and receiving a package. For example, FIG. 3B is a flowchart depicting processes performed by the system and method 101 of FIG. 1B in an exemplary procedure of sending and receiving a package 140. In step 331, the sender's personal device 117 communicates transport instructions from the TMS 170 to the PCD 150. In step 332, the sender's personal device 117 communicates previously stored log data on the package operations and status from the PCD 150 to the TMS 170.

In step 333, the PCD 150 starts to store new log data on the package operations and status. In step 334, the sender 111 attaches the PCD 150 to the package 140. In step 335, the PCD 150 locks attachment to the package 140. The package 140 is then dropped off, transported by an authorized transporter 112, and picked up in the transport destination by an authorized recipient 113. In step 391, the recipient's personal device 119 authorizes the recipient 113 with the PCD 150.

In step 392, the PCD 150 unlocks the attachment of the PCD 150 to the package 140. In step 393, the recipient 113 detaches the PCD 150 from the package 140. In step 394, the PCD 150 stops storing of log data on package operations and status. In step 395, the recipient's personal device 119 communicates to the recipient 113 the level of compliance of the completed transport with the transport conditions. In step 396, the recipient's personal device 119 checks if the transport was in compliance. In step 397, if the transport was not in compliance, the recipient's personal device 119 communicates to the TMS 170 information on the noncompliance.

Accordingly, in FIG. 3B, at step 335, the attachment of the PCD 150 to the package 140 can include a separate module and can be implemented, for example, as a pouch into which the PCD is inserted, or as a back cover that is attached to the PCD. The locking of the attachment of the PCD 150 to the package 140 can include a feature that mechanically hinders the opening of the package 150 and can be implemented, for example, as a latch holding a strap that physically encircles the package in one or more directions, as a latch holding a strap or a wire that loops through holes in zipper pulls on either side of an opening, as an adhesive pouch that spans across the lids of a cardboard box, or as a pair of U-shaped wings into which the lids of a cardboard box slide. The activation of the locking of the attachment of the PCD 150 to the package 140 can include a user input and can be implemented, for example, as a button, or reading of an NFC device.

Figure 3C:
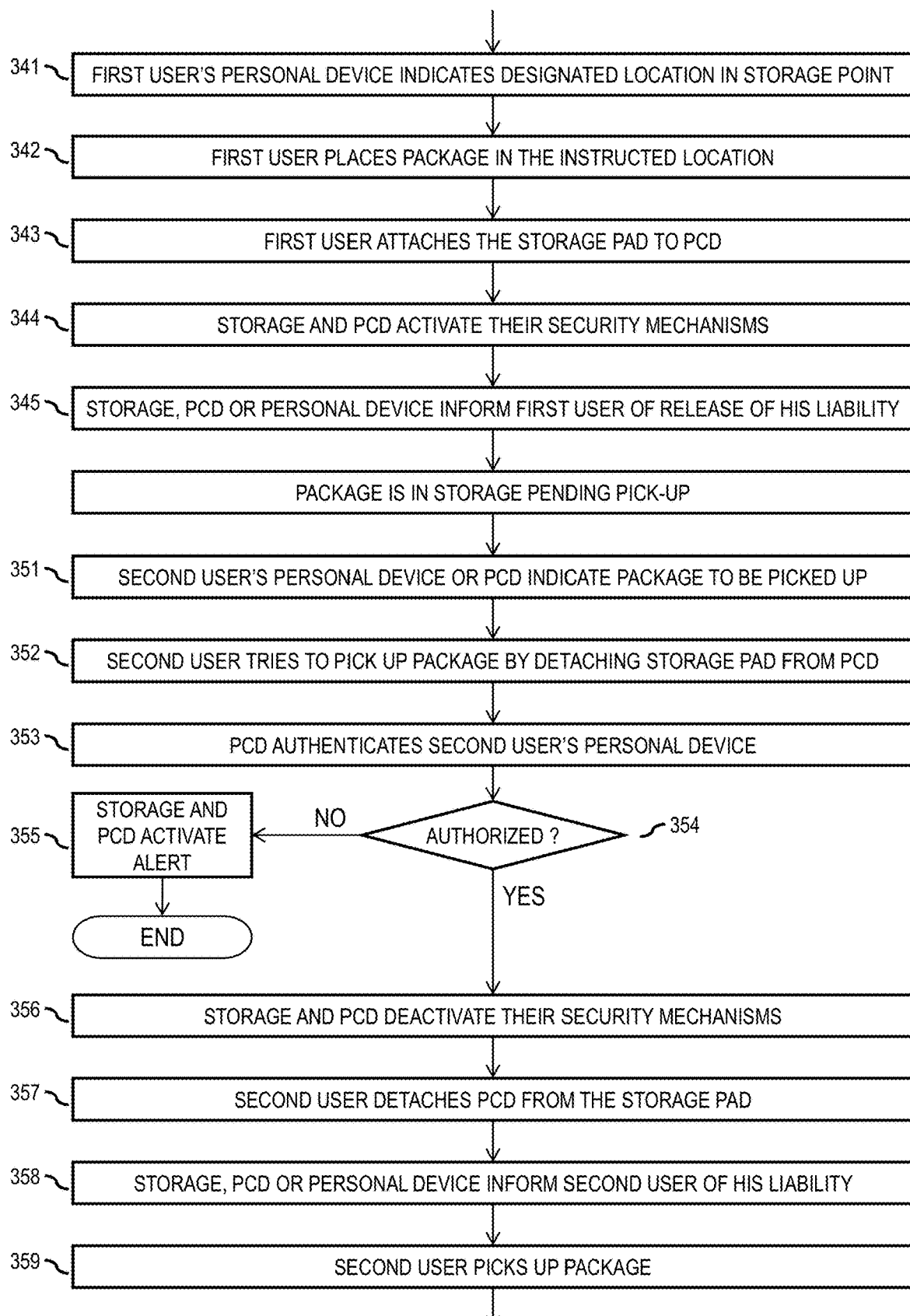
FIG. 3C shows an illustrative flowchart of processes performed by a goods transport and storage system and method in an exemplary procedure of dropping off and picking up a package in storage.

FIG. 3C shows an illustrative flowchart of processes performed by a goods transport and storage system and method in an exemplary procedure of dropping off and picking up a package in storage. For example, FIG. 3C is a flowchart depicting processes performed by the system and method 101 of FIG. 1B in an exemplary procedure of dropping off and picking up a package 140 in a storage device 130. In step 341, the first user's personal device 110 indicates the designated storage location in the storage device 130.

In step 342, the first user places the package 140 in the instructed storage location. In step 343, the first user attaches the storage PAD 133 to the PCD 150. In step 344, the storage device 130 and the PCD 150 activate their security mechanisms. In step 345, one or more of the storage device 130, the PCD 150 or the first user's personal device 110 inform the first user that his custody of and liability for the package 140 has been released. The package 140 is then in storage device 130 pending pick-up.

In step 351, one or more of the storage device 130, the second user's personal device 110 or the PCD 150 indicate which package 140 is to be picked up. In step 352, the second user tries to pick up the package 140 by detaching the storage PAD 133 from the PCD 150. In step 353, the PCD 150 authenticates the second user's personal device 110. In step 354, the PCD 150 checks if the second user is authorized. In step 355, if the second user is not authorized, one or more of the storage device 130 and the PCD 150 activate their alert mechanisms and prevent access to the package 140.

In step 356, if the second user is authorized, the storage device 130 and the PCD 150 deactivate their security mechanisms. In step 357, the second user detaches the PCD 150 from the storage PAD 133. In step 358, one or more of the storage device 130, the PCD 150 or the second user's personal device 110 inform the second user that he is now in custody of and has liability for the package 140. In step 359, the second user picks up the package 140 from the storage device 130.

Accordingly, in FIG. 3C, at step 353, the authentication of the second user's personal device 110 by the storage device 130 can be implemented, for example, by the user sending an SMS from the smart phone to a number associated with the storage.

Accordingly, in FIG. 3C, at step 351, the indication of which package 140 is to be picked up by one or more of the storage device 130, the second user's personal device 110 or the PCD 150 can further include detection of the user's movement and a user interface direction to package Accordingly, in FIG. 3C, at step 343 and 352, the attachment of the PCD 150 to the PAD 133 can include a physical interface and can be implemented, for example, with an asymmetrical connector that allows the direction of the PCD 150 and package to be easily detected or restricted. The PAD 133 can include a single interface device that includes a physical interface and a communication interface, which can further include a function that retransmits data that it receives over a different communication interface, thus allowing the operator's personal device 110 to access the communication interface of the PCD 150 via the PAD 133 even if the PCD's 150 communication interface is otherwise physically blocked by the PAD 133.

Figure 4:
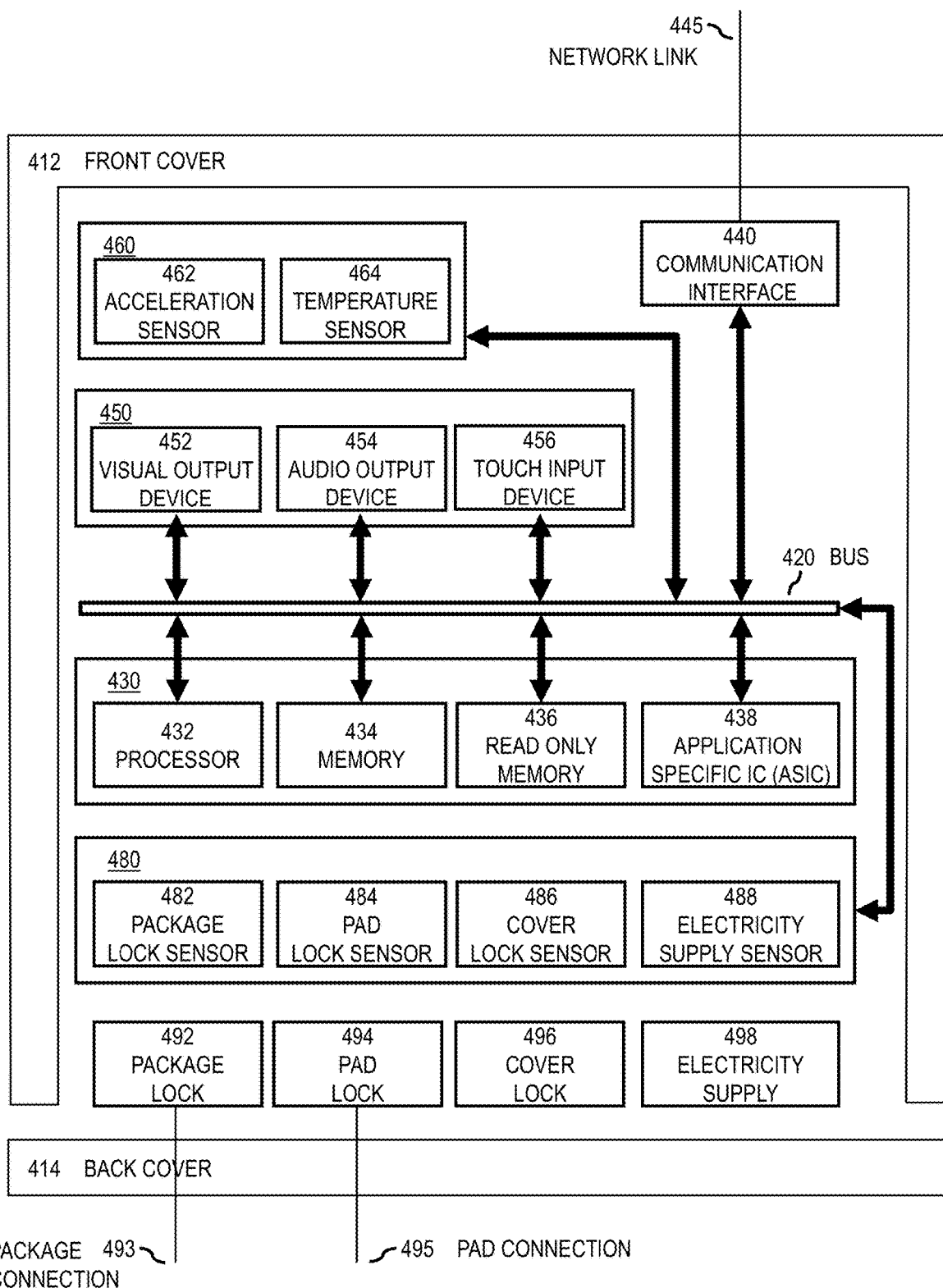
FIG. 4 shows an illustrative package control device attached to a package to transfer the package securely between participants of a package transport and/or storage operation and to monitor compliance with terms of service.

FIG. 4 shows an illustrative package control device 400 attached to a package to transfer the package securely between participants of a package transport and/or storage operation and to monitor compliance with terms of service. For example, FIG. 4 is an illustrative embodiment of a package control device (PCD) 400 that describes additional details of the PCD 150 of FIG. 1A or FIG. 1B.

In FIG. 4, generally, the PCD 400 provides for controlled access to a package 140 and its contents by users of the systems and methods of the present invention, and stores data on the status of or the operations performed with the package 140. The front cover 412 and back cover 414 protect the components inside the PCD 400 and can be implemented, for example, with a sealed water resistant or water-proof plastic casing. The bus 420 provides communication for the components inside the PCD 400. The processing module 430 can include a processor 432 coupled to the bus 420, a memory 434 coupled to the bus 420, a read-only memory 436 coupled to the bus 420 or an application-specific processor (ASIC) 438 that can be, for example, a processor providing cryptographic functions, coupled to the bus 420.

The communication interface 440 coupled to the bus 420 provides connectivity to other devices of the systems and methods of the present invention over network link 445. The user interface module 450 can include a visual output device 452 coupled to the bus 420, an audio output device 454 coupled to the bus 420, or a touch input device 456 coupled to the bus 420. The sensor module 460 coupled to the bus 420 can include an acceleration sensor 462 or a temperature sensor 464.

The interface sensor module 480 coupled to the bus 420 can include a package lock sensor 482, a PAD lock sensor 484, a cover lock sensor 486, or an electricity supply sensor 488. The package lock 492 provides for attachment of the PCD to a package 140 with package connection 495. The PAD lock 494 provides for attachment of the PCD to a PAD 133 with PAD connection 495. The cover lock 496 provides for attachment of the front cover 412 to the back cover 414. The electricity supply 498 provides electricity to the components inside the PCD 400 and can be implemented, for example, as a battery or a capacitor connected with an energy harvesting mechanism.

Accordingly, in FIG. 4, the bus 420 can include an interface to a detachable component module and can be implemented, for example, with an SD card interface to a processing module 430 implemented as an SD card.

Accordingly, in FIG. 4, the sensor module 460 can include other sensors and can be implemented, for example, with a humidity sensor, a pressure sensor, or a radioactivity sensor. The sensor module 460 can further include a mechanical protrusion in the back cover 414 or a detachable module connecting to the back cover 414 and providing sensor input from inside the package 140, and can be implemented, for example, with a heat conducting metal wire leading from a temperature sensor inside the PCD to the tip of a short plastic pipe inserted just inside a cardboard box between its lids when the PCD is placed on them.

Accordingly, in FIG. 4, the visual output device 452 and the touch input device 456 can be implemented, for example, with a single LED that is also used as a light sensor capable of detecting when the button where the LED is located is physically blocked by, for example, a finger.

Accordingly, in FIG. 4, the locks 492, 494 or 496 can include one or more mechanical buttons and one or more actuators where the actuator enables or disables the mechanical operation of the button whereas the mechanical operation of the button causes the lock to change state. This can be implemented, for example, with an actuator sliding a solid bar or disc under cover lock opening button in the first position, under both cover lock and package lock opening buttons in the second position, and under all of the cover lock, package lock and PAD lock opening buttons in the third position, thus preventing the forced opening of the mechanical locks.

Accordingly, in FIG. 4, the package lock 492 connects to the PCD package interface 154 of the system and method 101. The PAD lock 494 connects to the PCD attachment device interface 153 of system and method 101. The network link 445 connects to the PCD communication interface 151 of system and method 101. The user interface module 460 provides user interface 152 of system and method 101.

Accordingly, in FIG. 4, the electricity supply 498 can include an interface that can be used to connect it to an external electricity supply and can be implemented, for example, with a galvanic connection to a PAD including an electric cable.

Accordingly, in FIG. 4, the PCD can include a method controlling access to a package, including a device with a communication interface; a detachable module physically or mechanically connecting the package control device to the package; and a locking mechanism detecting opening of the package or the physical or mechanical disconnection of the package control device from the package. This can be implemented, for example, with the locking mechanism in the back cover 414 or a detachable module connecting to the back cover 414. The locking mechanism can be implemented, for example, with mechanical protrusions that can be used to attach the PCD to the package with one or more spikes that penetrate into a cardboard box and in combination with a tightened strap prevent the movement of the PCD from its position on the package, or with a fork-shaped module with one or more spikes passing through holes in one or more zipper pulls being attached to a slot in the back cover between the back cover and the package, or with a pair of U-shaped metal plates or loops of rigid wire that are normally flat against the back cover but can be pulled outwards as springs and in that position slid under the lids of a cardboard box where they in combination with a tightened strap prevent the opening of the lids. The opening of any of these locking mechanisms can be sensed with sensors such as an electric switch or a light sensor attached to the mechanical connectors, slots, hinges or strap locks.

Accordingly, the PCD 150 of system and method 100 of FIG. 1A, or the PCD 150 of system and method 101 of FIG. 1B, or system 400 of FIG. 4, can include a package and can be implemented, for example, by attaching the PCD to the zippers of a bag to allow locking of the package opening and of the PCD to the package and to the handle of the bag to allow lifting of the PCD using the PAD interface. The combination of a package 140 and a PCD 150 can further include a slot in the package 140 where the PCD 150 can be inserted and operated, or an environmental control module such as a refrigeration module or an inflatable shock absorbing module, or one or more PADs and can be implemented, for example, with a rigid plastic container with an electricity supply and internal modules.

Accordingly, the PCD 150 of system and method 100 of FIG. 1A, or the PCD 150 of system and method 101 of FIG. 1B, or system 400 of FIG. 4, can include a communication functionality where data communication from a first device of the systems and methods of the present invention over network link 445 and communication interface 440 is further communicated to a second device connectivity to a second device of the systems and methods of the present invention over the same or a different communication interface 440 and network link 445 and can be implemented, for example, by the PCD copying the memory buffer of one NFC device to the output memory buffer of another NFC device on a different side of a package. This allows the connection of two or more packages 140 with PCDs 150 together and communication from a personal device 110 to multiple PCDs over a connection with a single PCD interface.

Figure 5:
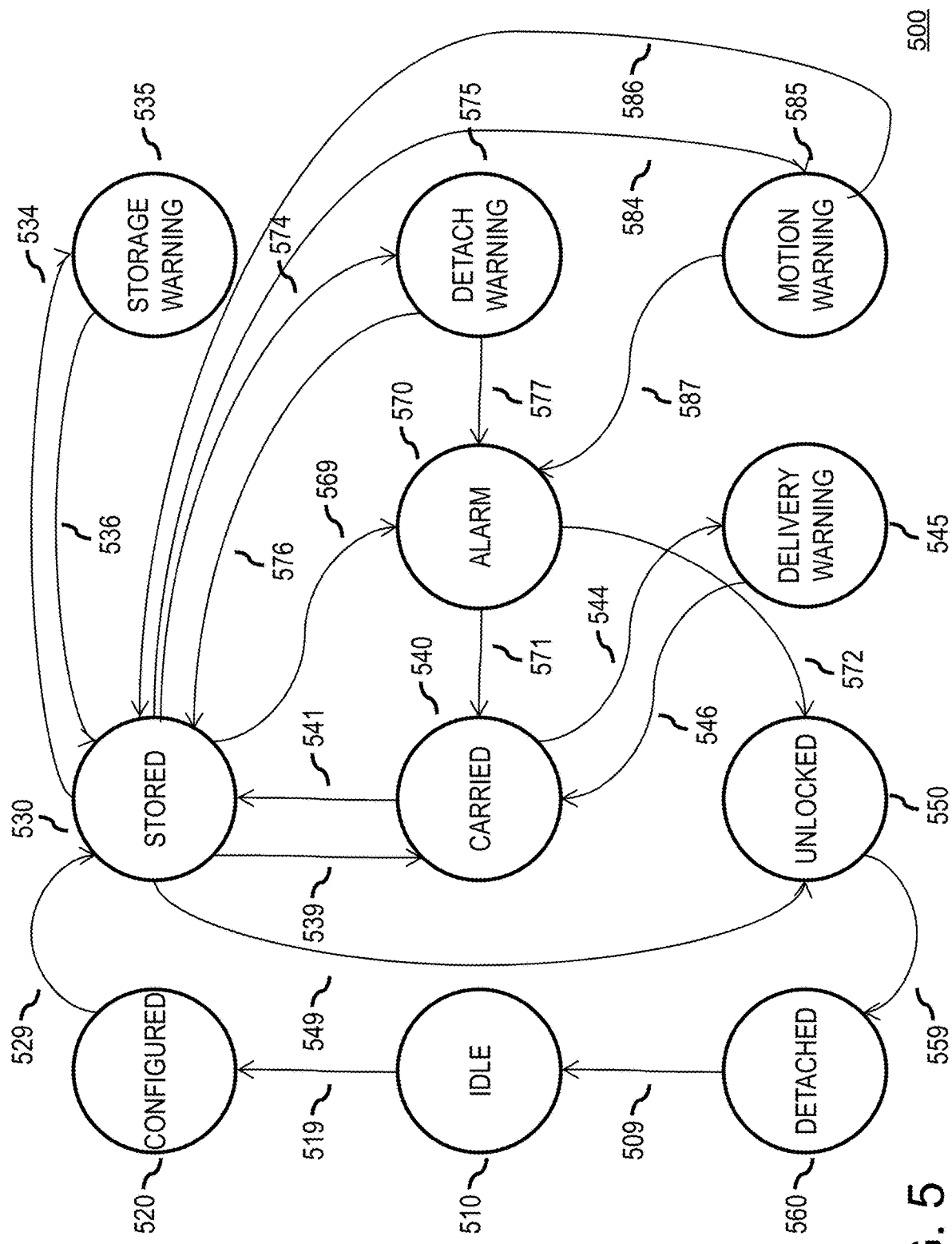
FIG. 5 shows an illustrative state machine in a package control device that controls access to a package and contents thereof.

FIG. 5 shows an illustrative state machine 500 in a package control device that controls access to a package and contents thereof. For example, FIG. 5 depicts the state machine 500 including states and state transitions of the PCD 150 of FIG. 1A or FIG. 1B, or the PCD 400 of FIG. 4 in an exemplary goods transport and/or storage procedure. In the "idle" state 510, the PCD 150 is not assigned to any transport and/or storage operation and does not have any active or pending transport instructions. The state transition 519 can be implemented, for example, by the sender writing of transport instructions and reading of log data stored in the PCD by a smart phone over an NFC interface.

The PCD 150 is then in the "configured" state 520, in which it has pending but not active transport instructions stored in its memory. The state transition 529 includes drop-off of the package 140 to a storage device 130 and can be implemented, for example, by a user pressing a button on the PCD after he has attached the PCD to the package and to a PAD connector.

The PCD 150 is then in the "stored" state 530, in which it has active transport instructions stored in its memory and is waiting for a user to access the package 140. The state transition 539 includes pick-up of the package 140 from the storage and can be implemented, for example, by a smart phone communicating to the PCD an authorized identifier over an NFC interface.

The PCD 150 is then in the "carried" state 540, in which it is being transported by the transporter 112. The state transition 541 includes drop-off of the package 140 to a storage device 130 and can be implemented, for example, by a user pressing a button on the PCD after he has attached the PCD to a PAD connector. The state transition 549 includes deactivation of the security feature of the PCD 150 and can be implemented, for example, by a smart phone communicating to the PCD an authorized identifier over an NFC interface.

The PCD 150 is then in the "unlocked" state 550, in which the package 140 can be accessed by the recipient 113. The state transition 559 includes pick-up of the package 140 from the storage 230 by the recipient 113 and can be implemented, for example, by a user detaching the PCD from the PAD connector.

The PCD 150 is then in the "detached" state 560, in which the package contents can be accessed by the recipient. The state transition 509 includes returning the PCD 150 to wait for use in a subsequent transport and can be implemented, for example, by a user detaching the PCD from the package. The state transition 534 includes detection of reduced compliance with the transport instructions and can be implemented, for example, by detecting a sensor input such as the PCD temperature that exceeds a threshold value.

The PCD 150 is then in the "storage warning" state 535, in which the PCD 150 can communicate to a user the reduced compliance and store associated log data in the PCD memory 434. The state transition 536 includes deactivation of the storage warning and can be implemented, for example, by detecting that the sensor input has returned below the threshold value, or by detecting the expiration of a timer started with state transition 534 and lasting, for example, 30 seconds. The state transition 544 includes detection of reduced compliance with the transport conditions and can be implemented, for example, by detecting a lack of state transition 541 by the time indicated in the transport conditions.

The PCD 150 is then in the "delivery warning" state 545, in which the PCD 150 can communicate to a user the reduced compliance. The state transition 546 includes deactivation of the delivery warning and can be implemented, for example, by detecting the state transition 541, or by detecting the expiration of a timer started with state transition 544 and lasting, for example, 30 seconds. The state transition 569 includes detection of an unauthorized user accessing the package 140 and can be implemented, for example, by detecting the unauthorized opening of the mechanism with which the PCD 150 is attached to the package 140.

The PCD 150 is then in the "alarm" state 570, in which the PCD 150 can communicate the alarm to users or other devices in the systems and methods of the present invention. The state transition 571 includes deactivation of the alarm by a transporter 112 and can be implemented, for example, by a smart phone communicating to the PCD an identifier authorized for pick-up of the package over an NFC interface. The state transition 572 includes deactivation of the alarm by the recipient 113 and can be implemented, for example, by a smart phone communicating to the PCD an identifier authorized for receiving the package over an NFC interface. The state transition 574 includes detection of unauthorized opening of the mechanism with which the PCD 150 is attached to the PAD 133 and can be implemented, for example, by detecting the disconnection of the link to the PAD.

The PCD 150 is then in the "detach warning" state 575, in which the PCD 150 can communicate to a user the need to reattach the PAD 133 or to authenticate himself. The state transition 576 includes deactivation of the detach warning and can be implemented, for example, by detecting the connection of the link to the PAD. The state transition 577 includes detection of an unauthorized user accessing the package 140 and can be implemented, for example, by detecting the lack of state transition 576 within, for example, 10 seconds of the state transition 574. The state transition 584 includes detection of unauthorized pick-up of the package 140 and can be implemented, for example, by detecting an accelerometer input that exceeds a threshold value.

The PCD 150 is then in the "motion warning" state 585, in which the PCD 150 can communicate to a user the need to stop moving the package 140 or to authenticate himself. The state transition 586 includes deactivation of the motion warning and can be implemented, for example, by detection that the accelerometer input has returned below the threshold value. The state transition 587 includes detection of an unauthorized user moving the package 140 and can be implemented, for example, by detecting the lack of state transition 586 within, for example, 5 seconds of the state transition 584.

Accordingly, in FIG. 5, instead of or in addition to states or state transitions executed in the PCD 150, the state machine 500 can include one or more of the states or state transitions, and the functionality of the PCD 150 associated with them, being executed in a personal device 110, in a storage device 130, in a server 180, or by a user with instructions that describe the states and state transitions. The execution of states or state transitions without execution in the PCD 150 can include a PCD 150 that is only a label and can be implemented, for example, the label being in the "configured" state 520 following the writing of an identifier on it by the user, or the smart phone of the transporter being in the "delivery warning" state 545 following the detection of missed drop-off time window in the smart phone.

Accordingly, in FIG. 5, the states in the state machine 500 can include one or more additional states and associated state transitions such as a preceding state including more advanced detection of the conditions causing the state transition to the main state, or a subsequent state including detection that the main state is sufficiently persistent and does not need to be reversed. The preceding state can be implemented, for example, before state 530 by activating the button on the PCD in the proximity of the time window for drop-off but prior to detection of the button being pressed, or the PCD activating its power consuming communication interface more frequently in order to detect faster when a user's smart phone attempts to communicate the drop-off event to the PCD. The subsequent state can be implemented, for example, after state 530 by detecting that the PCD is not properly attached to a PAD following state transition 529, and reverting to the state 520.

Figure 6:
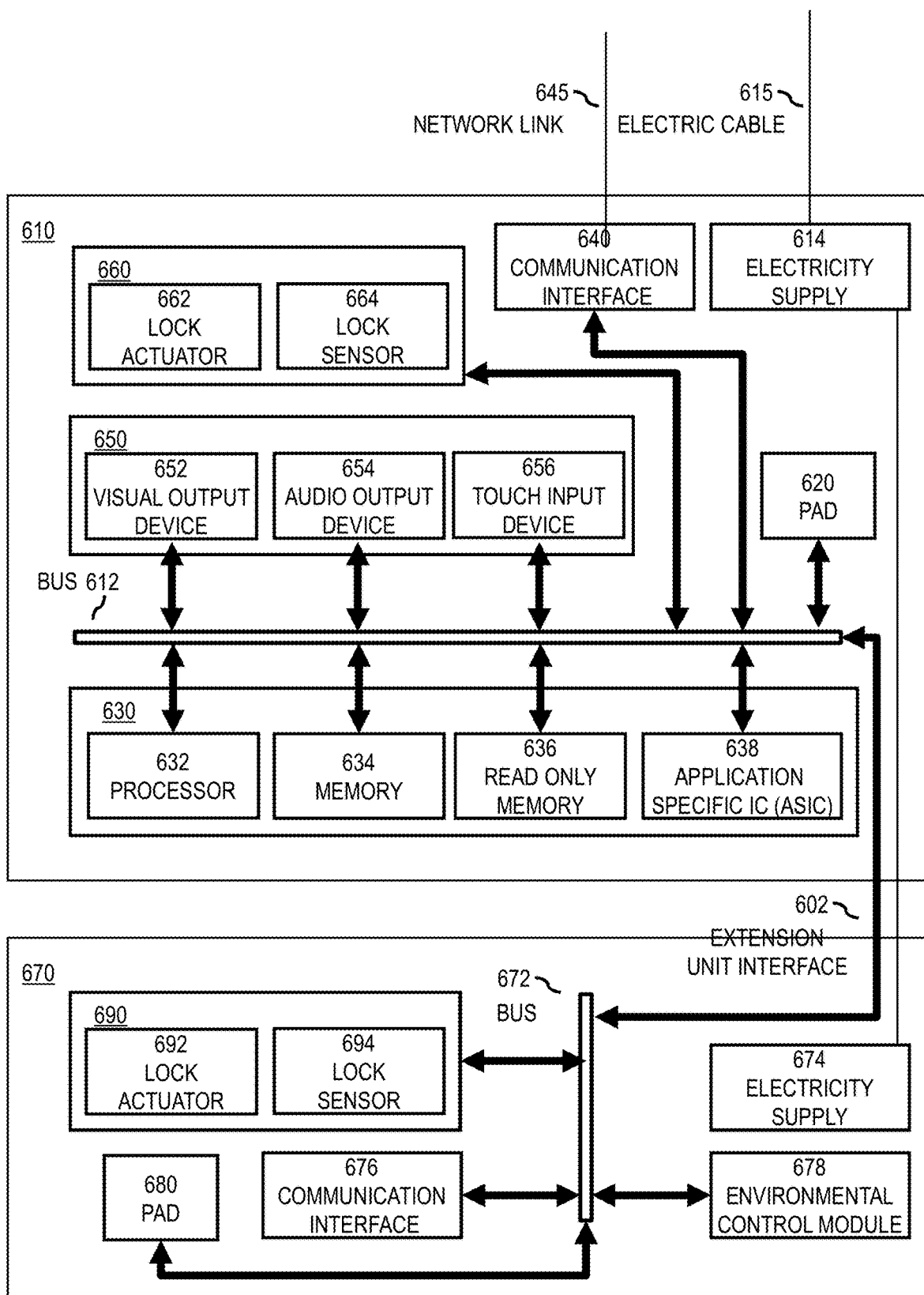
FIG. 6 shows an illustrative example of a storage device that stores packages securely and in compliance with terms of service before or after they are transported.

FIG. 6 shows an illustrative example of a storage system 600 that stores packages securely and in compliance with terms of service before or after they are transported. In FIG. 6, generally, the storage system 600 provides for controlled access to the package 140 and its contents by users of the systems and methods of the present invention, and stores data on the status and operations performed with the package 140. The main storage unit 610 provides control and wide-area connectivity for the storage 600 and the extension unit 670 provides additional or specialized storage capacity.

The main storage unit 610 and one or more extension units 670 can be connected with extension unit interface 602 that includes electricity cable and bus connectivity between the units 610 and 670 or two a first unit 670 and a second unit 670. The bus 612 provides communication for the components inside the storage units. The electricity supply 614 provides electricity for the components inside the main storage unit 610 and can be connected to an external electricity supply via electric cable 615.

The main storage unit 610 can include PADs 620 (e.g., which are PADs 133 of FIG. 1B) coupled to the bus 612. The processing module 630 can include a processor 632 coupled to the bus 612, a memory 634 coupled to the bus 612, a read-only memory 636 coupled to the bus 612 or an application-specific processor (ASIC) 638 that can be, for example, a processor providing cryptographic functions, coupled to the bus 612. The communication interface 640 coupled to the bus 612 provides connectivity to other devices or the internet over network link 645. The user interface module 650 can include a visual output device 652 coupled to the bus 612, an audio output device 654 coupled to the bus 612, or a touch input device 656 coupled to the bus 612.

The lock module 660 coupled to the bus 612 can include a lock actuator 662 or a lock sensor 664 to control access to storage locations or to the storage components, such as, for example, a door to the electricity supply 674 allowing change of the battery by an authorized transporter 112. The extension unit 670 includes a bus 672 that provides communication for the components inside storage units. The electricity supply 674 provides electricity for the components inside the extension storage unit 670 and can be connected to main storage unit's electricity supply 614 with extension unit interface 602.

The communication interface 676 coupled to the bus 672 provides connectivity to other devices in the systems and methods of the present invention and can be implemented, for example, as an NFC interface. The environmental control module 678 coupled to the bus 672 provides storage conditions that allow the storage 600 to be in compliance with the transport conditions and can be implemented, for example, with a refrigeration mechanism. The extension storage unit 670 can include PADs 680 (e.g., which are PADs 133 of FIG. 1B) coupled to the bus 672. The lock module 690 coupled to the bus 672 can include a lock actuator 692 or a lock sensor 694.

Accordingly, in FIG. 6, the main storage unit 610 or the extension storage unit storage 670 can further include a sensor module that senses conditions inside or outside the storage 600 and can be implemented, for example, with a temperature sensor providing temperature information, with an acceleration sensor providing movement information of a storage located in a vehicle, or with a camera sensor providing visual input, or an infrared sensor or a radio sensor providing location information of users or packages.

Accordingly, in FIG. 6, the communication interface 640 can include interfaces to different networks and can be implemented, for example, with a cellular interface to the internet and an NFC interface to an NFC device.

Accordingly, in FIG. 6, the lock module 660 can include a lock of the extension unit interface 602 connector and can be implemented, for example, as a physically secured separate door controlled by the lock actuator or the lock sensor.

Accordingly, in FIG. 6, the PAD 620 or PAD 680 can include a lock module and can be implemented, for example, with a mechanical bar extended from the PAD connector into the interface in the PCD when a user pulls a trigger, wherein a lock actuator can block the pulling of the trigger or a lock sensor can detect the pulling of the trigger.

Accordingly, in FIG. 6, the storage extension unit 670 can further include cryptographic protection of the data communicated over the extension unit interface 602 and can be implemented, for example, by incorporating an additional processing module to the storage extension unit.

Accordingly, in FIG. 6, the storage system 600 can further include management of available capacity in the storage system, including determination of the storage priority order of packages 140; and causing transactions that remove packages from the storage or return packages to the storage. The factors used in the determination can include a targeted occupancy rate, the remaining space in the storage device 130, the expected packages transported to and from the storage device 130, the quotas of users of the packages 140, the price paid for the storage of packages 140 or the transport and/or storage conditions of packages 140. This can be implemented, for example, by the storage making a query in a database of the packages that it contains when 90% of the storage locations are allocated to identify a package that has exceeded its pick-up time window with the longest amount of time, and creating a transport request to transport that package to a second, longer-term storage. And when less than 50% of the storage locations are allocated, creating a transport request to transport that package back from the second, longer-term storage. This allows the initiation of transactions that temporarily remove or return packages 140 or rearrange packages 140 in the storage. The determination of the storage priority can further include mediation of compensation between users of packages 140 in the storage device 130 based on their excess or deficit of used storage space relative to their quotas with the storage device 130, or based on market pricing of storage space in the storage device 130.

Figure 7:
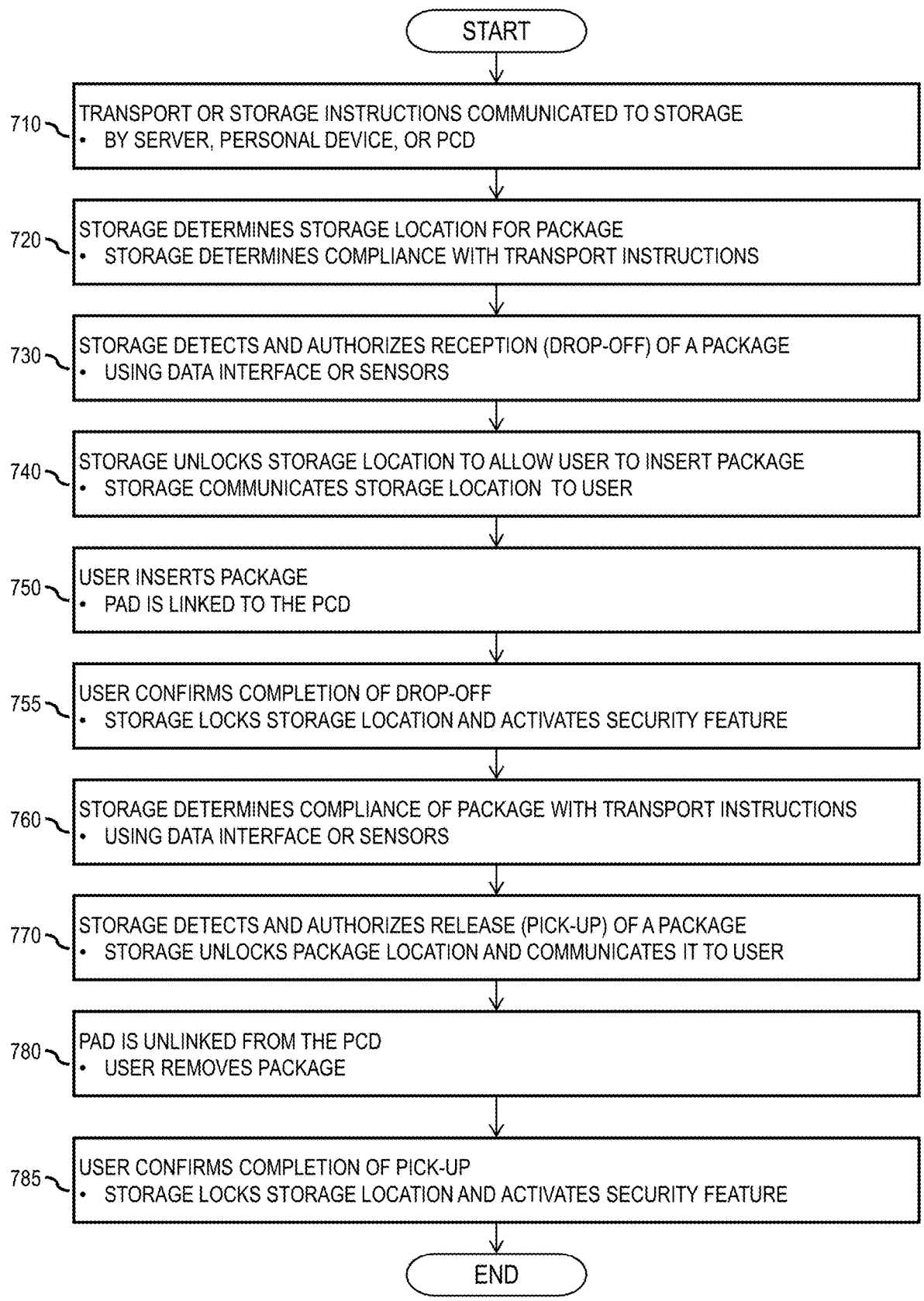
FIG. 7 shows an illustrative flowchart of processes performed by a storage device in an exemplary procedure of receiving, storing and releasing a package.

FIG. 7 shows an illustrative flowchart of processes performed by a storage device in an exemplary procedure of receiving, storing and releasing a package. For example, FIG. 7 is a flowchart depicting processes performed by the storage device 130 of FIG. 1B or the system 600 of FIG. 6 in an exemplary procedure of receiving, storing and releasing a package 140. In step 710, a server 180, a personal device 110, or a PCD 150 communicates transport instructions (e.g., which can include storage instructions) to the storage device 130 and the storage device 130 configures, for example, its access control function based on the authorization information in the instructions.

In step 720, the storage device 130 determines the storage location for the package 140 so that the storage device 130 is in compliance with the transport conditions. In step 730, the storage device 130 detects and authorizes the reception of a package 140, which can be implemented, for example, by using an NFC interface or a camera sensor to detect the package or the user dropping off the package.

In step 740, the storage device 130 unlocks access to the storage location determined for the package 140 and communicates the storage location to the user, which can be implemented, for example, by storage sending an event to a user interface output device in the storage, the storage location, the smart phone of the user, or the PCD attached to the package. In step 750, the user places the package 140 in the storage location and the PAD 133 is linked to the PCD 150, which can be implemented, for example, by the user attaching the PAD connector to the PCD. In step 755, the user confirms the completion of the drop-off, which can be implemented, for example, by the user pressing a button in the PCD or user interface of a smart phone, the user operating a door in the storage location, or the storage detecting with a sensor or a data link that the user leaves the proximity of the storage location, and the storage locks access to the storage location and activates the security feature.

In step 760, the storage device 130 determines the compliance of the package with transport conditions, which can be implemented, for example, by detecting whether a temperature sensor input in the storage location exceeds a threshold value. In step 770, the storage device 130 detects and authorizes the release of a package 140, which can be implemented, for example, by using an NFC interface or sensors to detect the user picking up the package, and the storage device 130 unlocks access to the storage location determined for the package 140 and communicates the storage location to the user.

In step 780, the PAD 133 is unlinked from the PCD 150, which can be implemented, for example, by the user detaching the PAD connector from the PCD, and the user removes the package 140 from the storage location. In step 785, the user confirms the completion of the pick-up, and the storage device 130 locks access to the storage location and activates the security feature.

Accordingly, in FIG. 7, steps 710, 720, 740 and 770 can include a server 180 or a personal device 110 configuring planned storage operations data in the storage device 130; a personal device 110 of the operator of the package 140 communicating identification data to the storage device 130; the storage device 130 determining how the identification data corresponds to the configured storage operations data; and the storage device 130 causing the operator of the package 140 to have access to the storage location of the package 140 indicated in the storage operations data. This can be implemented, for example, by a smart phone writing transport operations data to memory in the storage over an NFC communication interface; the smart phone communicating an identifier associated with the operator to the storage over an NFC communication interface; the storage identifying a match of the communicated identifier with the identifier stored in the transport operations data in the memory; and the storage deactivating the security function controlling access to the package associated with the operator.

Accordingly, in FIG. 7, the storage device 130 can include functions such as a user interface and server connectivity that emulate a personal device 110 and can be implemented, for example, with the storage authenticating the user by the user inputting a password on the storage touch screen and the storage communicating the authentication information to the PCD, followed by the PCD authorizing the user to access the package and deactivating its security features.

Accordingly, in FIG. 7, the storage device 130 can include functions such as a user interface that emulate a PCD 150 and can be implemented, for example, with the storage authenticating the user by detection over NFC interface of his smart phone and identifying the package with pattern recognition from a camera input, followed by the storage authorizing the user to access the package and deactivating its security features.

Accordingly, in FIG. 7, step 720, the determination of a storage location can include determination of the accessibility of the package 140 in a storage by other users than the one authorized to access the package 140 and can be implemented, for example, with a flag in the storage conditions allowing storage in a storage locker that is used to store one or more packages.

Accordingly, in FIG. 7, step 720, the determination of a storage location can include determination of the capacity of a storage location and can be implemented, for example, by a radio sensor or ultrasound sensor or pressure sensor or light sensor in the storage location receiving a signal, and an analysis functionality in the processing module comparing the received signal to signals associated with different amounts of goods stored in the storage location.

Accordingly, in FIG. 7, step 785, the activation of the security feature can include determination of the condition of other packages in the same storage location from which the package war removed and can be implemented, for example, by comparing pictures taken by a surveillance camera before and after the removal to determine that other packages remain in the storage location.

It is to be understood that the systems and methods of the present invention are for exemplary purposes, as many variations of the specific hardware used to implement the embodiments of the present invention are possible, as will be appreciated by those skilled in the relevant art(s). For example, the functionality of the devices and the subsystems of the illustrative systems and methods can be implemented via one or more programmed computer systems and/or devices, and the like.

To implement such variations as well as other variations, a single computer system (e.g., the computer system 800 of FIG. 8) can be programmed to perform the special purpose functions of one or more of the devices and subsystems of the systems and methods of the present invention, or a single mechanical system can be implemented to perform the special purpose functions of one or more of the mechanical devices and subsystems of the systems and methods of the present invention. On the other hand, two or more systems or devices can be substituted for one of the devices and subsystems of the systems and methods of the present invention. Accordingly, principles and advantages of distributed processing, such as redundancy, replication, etc., also can be implemented, as desired, to increase the robustness and performance of the systems and methods of the present invention, for example.

Figure 8:
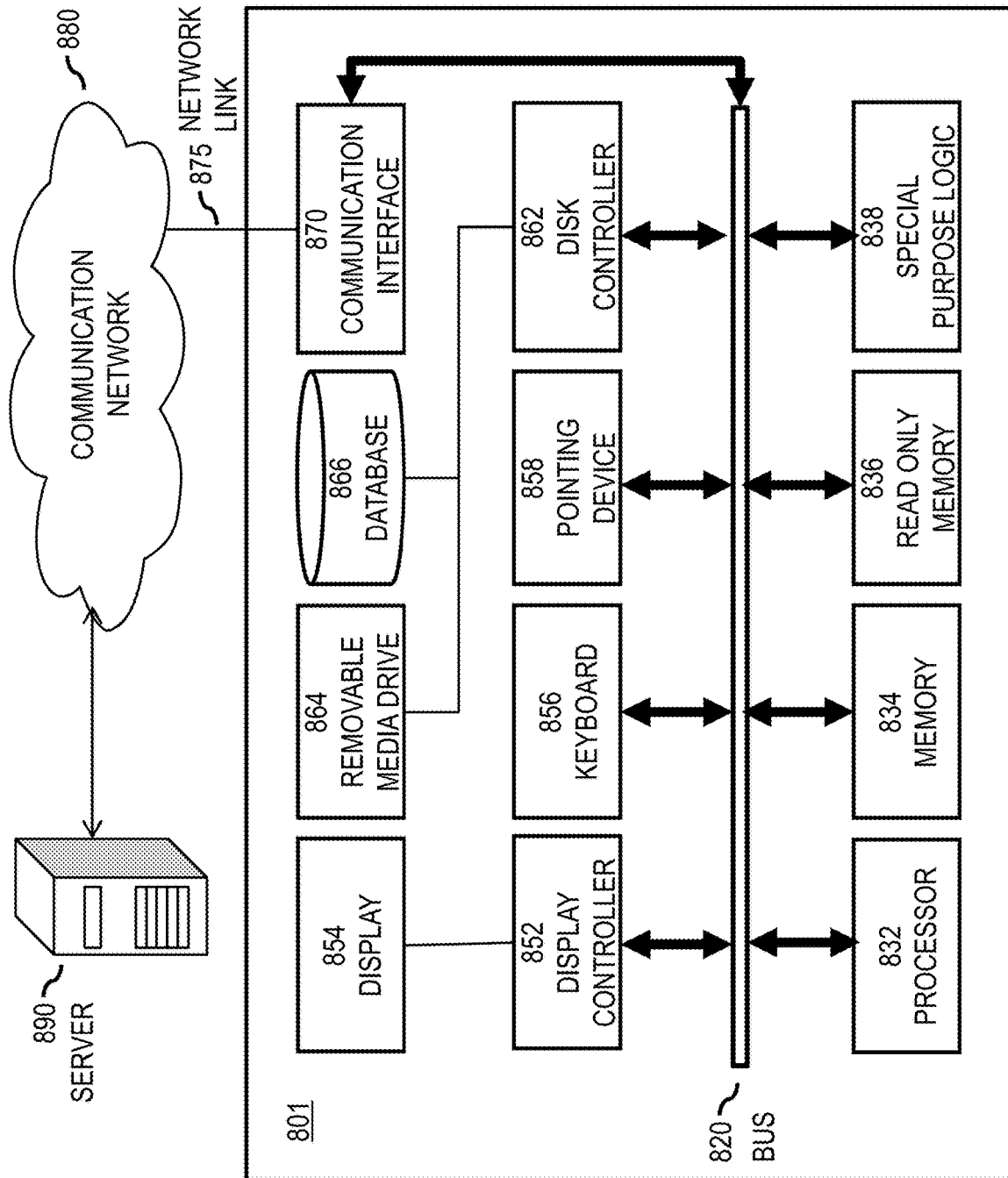
FIG. 8 shows an illustrative example of a computer system that can be used to perform various processes in a goods transport and storage system and method.

FIG. 8 illustrates a computer system 800 upon which embodiments of the present invention (e.g., devices and subsystems of the systems and methods of the present invention) can be implemented. The embodiments of the present invention can be implemented on a single such computer system, or a collection of multiple such computer systems. The computer system 800 can include a bus 820 or other communication mechanism for communicating information, and a processor 832 coupled to the bus 820 for processing the information. The computer system 800 can also include a memory 834, such as a random access memory (RAM), other dynamic storage device (e.g., dynamic RAM (DRAM), static RAM (SRAM), synchronous DRAM (SDRAM), flash memory), etc., coupled to the bus 820 for storing information and instructions to be executed by the processor 832.

In addition, the memory 834 can also be used for storing temporary variables or other intermediate information during the execution of instructions by the processor 832. The computer system 800 can further include a read only memory 836 or other static storage device (e.g., programmable ROM (PROM), erasable PROM (EPROM), electrically erasable PROM (EEPROM), etc.) coupled to the bus 820 for storing static information and instructions.

The computer system 800 can also include a disk controller 862 coupled to the bus 820 to control one or more storage devices for storing information and instructions, such as a magnetic hard disk 866, and a removable media drive 864 (e.g., USB memory card drive, SD card drive, floppy disk drive, read-only compact disc drive, read/write compact disc drive, tape drive, and removable magneto-optical drive). The storage devices can be added to the computer system 800 using an appropriate device interface (e.g., small computer system interface (SCSI), integrated device electronics (IDE), enhanced-IDE (EIDE), direct memory access (DMA), ultra-DMA), universal serial bus (USB), Firewire (IEEE 1394), or Bluetooth (IEEE 802.15.1).

The computer system 800 can also include special purpose logic devices 838, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, communications functions, etc.

The computer system 800 also can include a display controller 852 coupled to the bus 820 to control a display 854, such as a cathode ray tube (CRT), liquid crystal display (LCD), active matrix display, plasma display, touch display, etc., for displaying or conveying information to a computer user. The computer system can include input devices, such as a keyboard 856 including alphanumeric and other keys and a pointing device 858, for interacting with a computer user and providing information to the processor 832. The pointing device 858 can include, for example, a mouse, a trackball, a pointing stick, etc., or voice recognition processor, etc., for communicating direction information and command selections to the processor 832 and for controlling cursor movement on the display 854. In addition, a printer can provide printed listings of the data structures/information of the systems and methods of the present invention or any other data stored and/or generated by the computer system 800.

The computer system 800 can perform one or more processing steps of the invention in response to the processor 832 executing one or more sequences of one or more instructions contained in a memory, such as the memory 834. Such instructions can be read into the memory 834 from another computer readable medium, such as the hard disk 866 or the removable media drive 864. Execution of the arrangement of instructions contained in the memory 834 causes the processor 832 to perform the process steps described herein. One or more processors in a multiprocessing arrangement also can be employed to execute the sequences of instructions contained in the main memory 834. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 800, for driving a device or devices for implementing the invention, and for enabling the computer system 800 to interact with a human user (e.g., users of the systems and methods of the present invention, etc.). Such software can include, but is not limited to, device drivers, firmware, operating systems, development tools, applications software, etc. Such computer readable media can further include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 800 also can include a communication interface 870 coupled to the bus 820. The communication interface 870 can provide a two-way data communication coupling to a network link 875 that is connected to a communications network such as, for example, a local area network (LAN), a wide area network (WAN), a global packet data communications network, such as the Internet, etc. For example, the communication interface 870 can include a digital subscriber line (DSL) card or modem, a cable modem, a telephone modem, etc., to provide a data communication connection to a corresponding type of telephone line. As another example, the communication interface 870 can include a local area network (LAN) card (e.g., for Ethernet, etc.), etc., to provide a data communication connection to a compatible LAN. Wireless links can also be implemented. In any such implementation, the communication interface 870 can send and receive electrical, electromagnetic, or optical signals that carry digital data streams representing various types of information. Further, the communication interface 870 can include peripheral interface devices, such as a Universal Serial Bus (USB) interface, a PCMCIA (Personal Computer Memory Card International Association) interface, etc.

The network link 875 typically can provide data communication through one or more networks to other data devices. For example, the network link 875 can provide a connection through the communications network 880 to a server 890. The communications network 880 can employ electrical, electromagnetic, or optical signals to convey information and instructions. The signals through the various networks and the signals on the network link 875 and through the communication interface 870, which communicate digital data with computer system 800, are exemplary forms of carrier waves bearing the information and instructions.

The computer system 800 can send messages and receive data, including program code, through the communications network 880, the network link 875, and the communication interface 870. In the Internet example, a server can transmit requested code belonging to an application program for implementing an embodiment of the present invention through communications network 880 and the communication interface 870. The processor 832 can execute the transmitted code while being received and/or store the code in the storage devices 864 or 866, or other non-volatile storage for later execution. In this manner, computer system 800 can obtain application code in the form of a carrier wave. With the system of FIG. 8, the embodiments of the present invention can be implemented on the Internet as a Web Server 800 performing one or more of the processes according to the embodiments of the present invention for one or more computers coupled to the web server 800 through the network 880 coupled to the network link 870.

The term "computer readable medium" as used herein can refer to any medium that participates in providing instructions to the processor 832 for execution. Such a medium can take many forms, including but not limited to, non-volatile media, volatile media, transmission media, etc. Non-volatile media can include, for example, optical or magnetic disks, magneto-optical disks, etc., such as the hard disk 866 or the removable media drive 864. Volatile media can include dynamic memory, etc., such as the memory 836. Transmission media can include coaxial cables, copper wire and fiber optics, including the wires that make up the bus 820. Transmission media can also take the form of acoustic, optical, or electromagnetic waves, such as those generated during radio frequency (RF) and infrared (IR) data communications.

As stated above, the computer system 800 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to communications network 880. In such a scenario, the remote computer can load the instructions into memory and send the instructions, for example, over a telephone line using a modem. A modem of a local computer system can receive the data on the telephone line and use an infrared transmitter to convert the data to an infrared signal and transmit the infrared signal to a portable computing device, such as a personal digital assistant (PDA), a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

Figure 9:
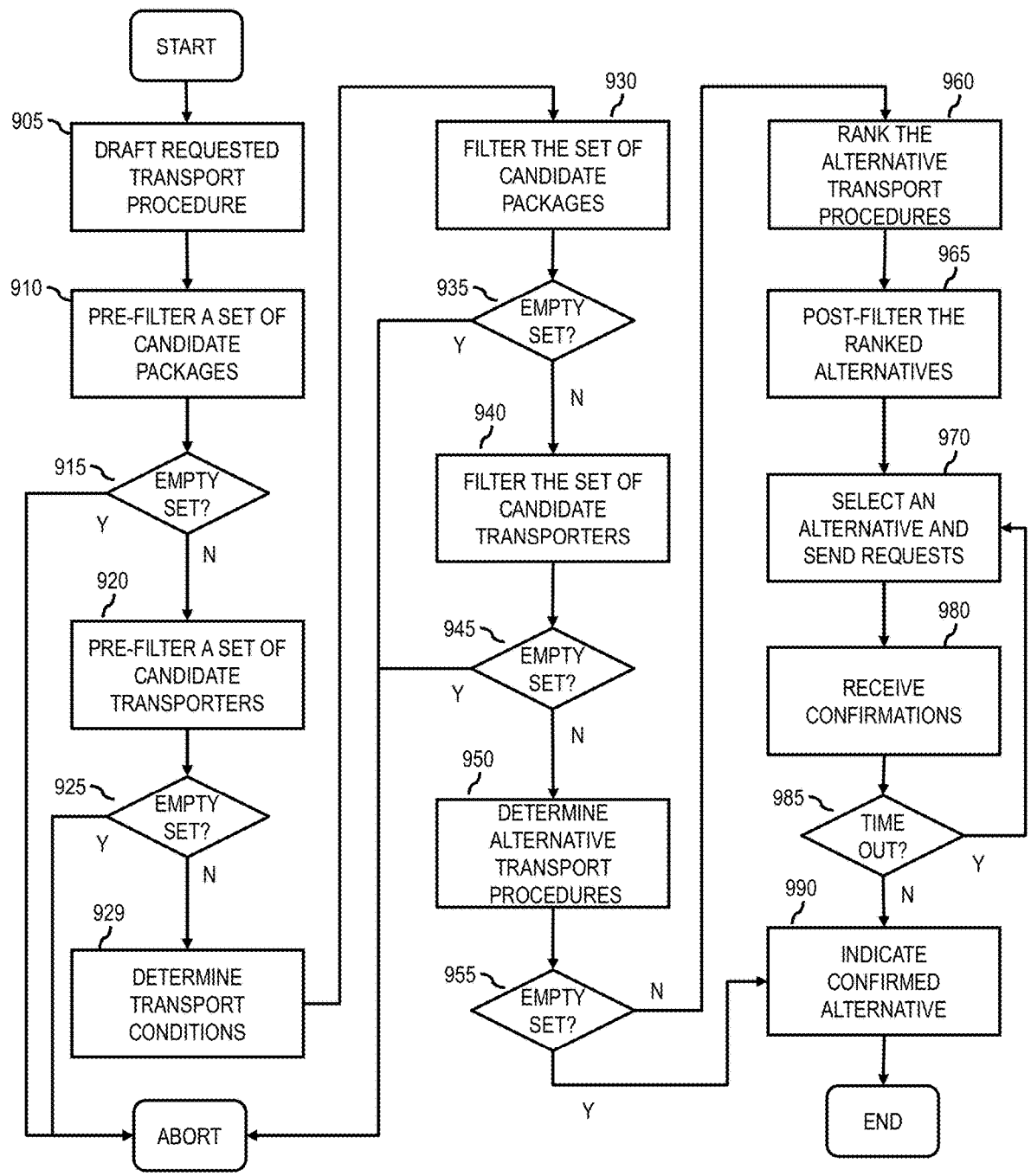
FIG. 9 shows an illustrative flowchart depicting processes performed by a management system in an exemplary procedure of determining packages and transporters for transported goods.

FIG. 9 is a flowchart depicting processes performed by, for example, the TMS 170 of FIG. 1B in an exemplary procedure of determining packages and transporters for the transported goods, for example in response to a transport request. In step 905 the TMS 170 or the sender's personal device 117 creates a tentative route and schedule from the starting point to the destination point of the transport request. In step 910 the TMS 170 or the sender's personal device 117 determines packages 140 whose locations before the starting time of the transport are accessible to the sender and queries their capabilities, such as heat insulation capability.

In step 915 the TMS 170 aborts the transport matching if no suitable packages 140 were found (and e.g., the transport request mandated the TMS 170 to identify a package 140). In step 920 the TMS 170 determines transporters 112 whose transport offers have end points that are within same general area as the transport request end points, such as in the same city. In step 925 the TMS 170 aborts the transport matching if no suitable transporters 112 were found (e.g., the TMS 170 can restart the determination procedure at a later point in time when new transport offers may have been created by transporters 112 in the area).

In step 929 the TMS 170 determines transport conditions based, for example, on the sender 111 preferences or criteria specified in the transport request. In step 930 the TMS 170 determines packages 140 from the list of packages 140 of step 910 that are in compliance with the transport conditions of step 929, such as packages 140 with a refrigeration functionality. In step 935 the TMS 170 aborts the transport matching if no suitable packages 140 were found (and the transport request mandated the TMS 170 to strictly comply with the sender 111 preferences or criteria). In step 940 the TMS 170 determines transporters 112 from the list of transporters 112 of step 920 that are in compliance with the transport conditions of step 929 if using one of the packages 140 determined in step 930. The determination of step 940 can include multiple transporters 112 and storages 130 where a combination of the transport end points of one transporter 112 are the same as the transport end points of another transporter 112, and where such an end point may be the same as the location of a storage device 130.

In step 945 the TMS 170 aborts the transport matching if no suitable transporters 112 were found (and e.g., the transport request mandated the TMS 170 to strictly comply with the sender 111 preferences or criteria). In step 950 the TMS 170 repeats the procedure of step 940 for all alternative combinations that comply with the transport conditions. In step 955 the TMS 170 confirms the first determined transporter or combination of transporters if no alternatives were found and proceeds to step 990. In step 960 the TMS 170 or the sender's personal device 117 ranks the alternative transport procedures of step 950 based on criteria such as the combined price of transport offers and storage offers, or the lowest reputation of transporters participating in the combined transport.

In step 960 the TMS 170 or the sender's personal device 117 determines a set of the alternatives to be presented to the user, such as the cheapest alternative and the alternative with the highest minimum reputation of transporters and the alternative at a midpoint of prices and minimum reputations of the alternatives. In step 970 the sender 111 confirms the selection of one of the alternatives and the sender's personal device 117 authorizes the TMS 170 to send transport request confirmations to the transporters 112 in that alternative. In step 980 the TMS 170 receives confirmations to the specific transport request with exact transport conditions (including end points, schedules and other conditions) from the transporters 112. In step 985 the TMS 170 may send transport request confirmations to the transporters 112 in a secondary alternative if the transporters 112 of the first alternative did not confirm by a deadline. In step 990 the TMS 170 and the sender's personal device 117 indicate to the senders 111 the confirmed transport, and TMS 170 and the transporter's personal devices 118 indicate to the transporters 112 their part in the combined transport procedure.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments capable of performing the processes of the illustrative embodiments of the present invention can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A computer implemented system for managing transportation and storage of packages to individuals, the system comprising:
   a server;
   a first device;
   a second device;
   a package control device;
   a package;
   the server having a processor, a memory and a communication network interface;
   the first and second devices having a processor, a memory, a communication network interface and a proximity interface;
   the server and the package control device having transport and storage information;
   the package control device is attached to the package,
   the transport and storage information comprises authentication information employed to authorize a handover of the package,
   the authentication information comprises message authentication information determined using authorization key information of the server,
   the server communicates the transport and storage information over the communication network interface to the first and the second device,
   the first or the second device receives the transport and storage information over the proximity interface from the package control device and compares the authentication information communicated with the server and received from the package control device, and authorizes the handover of the package.

2. The system of claim 1, wherein the package control device comprises a Bluetooth device, a NFC device, or a RFID device, the proximity interface comprises a short range wireless interface, the RFID tag or the Bluetooth device comprises a package identifier and the message authentication information determined using authorization key information of the server, the first or the second device receives the transport and storage information over the proximity interface from the package control device and compares the package identifier and the authentication information communicated with the server and from the package control device, and authorizes the handover of the package.

3. The system of claim 1, wherein the package control device comprises a barcode, a QR-code, a printed symbol or a written symbol, the proximity interface comprises an optical interface, the barcode, QR-code, printed symbol or written symbol comprises a package identifier and the message authentication information determined using authorization key information of the server, the first or the second device receives the transport and storage information over the proximity interface from the package control device and compares the package identifier and the authentication information communicated with the server and from the package control device, and authorizes the handover of the package.

4. The system of claim 1, further comprising:

the first or the second device comprising a sensor device;

the first or the second device comprising a security device;

the sensor device comprising a clock, a location sensor, an acceleration sensor, a proximity sensor, a pressure sensor, a light sensor or a camera;

the security device comprising a lock or an alarm;

wherein the first or the second device determines an occurrence of the handover of the package with the sensor device, and the first or the second device deactivates the security device if the handover is authorized.

5. The system of claim 1, further comprising:

the server having a compliance enforcement process;

the transport and storage information comprising compliance information;

the compliance information comprising information of an authorized timing or an authorized location of a handover;

wherein the compliance enforcement process in the server generates compliance information for the transport and storage of the package, the first or the second device performs compliance measurements, the first or the second device communicates the compliance measurements to the server, the server generates evaluated compliance information by comparing the compliance information and the compliance measurements, the compliance enforcement process in the server determines reliability of the first or the second device based on the evaluated compliance information, and the server determines the authentication information employed to authorize the handover of the package based on the reliability of the first or the second device.

6. The system of claim 1, further comprising:

a third device;

the third device having a processor, a memory and a proximity interface;

the authentication information comprising authentication information of the third device;

wherein the third device communicates authentication information over the proximity interface with the first or the second device or the package control device, and the third device determines the authorization of the handover of the package in addition to authorization performed by the first or the second device.

7. The system of claim 1, further comprising:

proximity information;

the proximity information comprising threshold information of proximity distance or timing of proximity entry or exit, wherein the first or the second device determines the proximity information, and the first or the second device determines the handover by comparing the proximity information and threshold proximity information.

8. The system of claim 1, further comprising:

the transport and storage information communicated by the server with the first or the second device comprising a transport offer, a transport request and transport performance information, wherein the server determines the authentication information employed to authorize a handover of the package by comparing the transport offer and the transport request and the transport performance information.

9. The system of claim 1, further comprising:

a user interface;

the user interface configured for the presentation of the movement or direction of the user of the first or the second device relative to the package;

wherein the first or the second device employs the user interface to perform communicate to the user the authorized authorization of the handover of the package.

10. A computer implemented method for managing transportation and storage of packages to individuals, the method comprising:

providing a server;

providing a first device;

providing a second device;

providing a package control device;

providing a package;

providing in the server a processor, a memory and a communication network interface;

providing in the first and second devices a processor, a memory, a communication network interface and a proximity interface, providing in the server and the package control device transport and storage information, wherein the transport and storage information comprises authentication information employed to authorize a handover of the package, and the authentication information comprises message authentication information determined using authorization key information of the server;

attaching the package control device to the package;

communicating with the server the transport and storage information over the communication network interface to the first and the second device;

receiving in the first or the second device the transport and storage information over the proximity interface from the package control device;

comparing with the first or the second device the authentication information communicated with the server and received from the package control device; and authorizing with the first or the second device the handover of the package.

11. The method of claim 10, wherein the package control device comprises a Bluetooth device, a NFC device, or a RFID device,
the proximity interface comprises a short range wireless interface,
the RFID tag or the Bluetooth device comprises a package identifier and the message authentication information determined using authorization key information of the server,
further comprising receiving in the first or the second device the package identifier and authentication information from the package control device over the proximity interface, and
determining with the first or the second device the authorization of the handover by comparing the package identifier and the authentication information communicated by the server and received from the package control device, and
authorizing with the first or the second device the handover of the package.

12. The method of claim 10, wherein the package control device comprises a barcode, a QR-code, a printed symbol or a written symbol,
the proximity interface comprises an optical interface,
the barcode, QR-code, printed symbol or written symbol comprises a package identifier and the message authentication information determined using authorization key information of the server,
further comprising receiving in the first or the second device the package identifier and authentication information from the package control device over the proximity interface, and
determining with the first or the second device the authorization of the handover by comparing the package identifier and the authentication information communicated by the server and received from the package control device, and
authorizing with the first or the second device the handover of the package.

13. The method of claim 10, further comprising:
the first or the second device comprising a sensor device;
the first or the second device or comprising a security device;
the sensor device comprising a clock, a location sensor, an acceleration sensor, a proximity sensor, a pressure sensor, a light sensor or a camera;
the security device comprising a lock or an alarm;
determining with the first or the second device an occurrence of the handover of the package with the sensor device, and
deactivating with the first or the second device the security device if the handover is authorized.

14. The method of claim 10, further comprising:
the server having a compliance enforcement process;
the transport and storage information comprising compliance information;
the compliance information comprising information of an authorized timing or an authorized location of a handover;
generating with the compliance enforcement process in the server compliance information for the transport and storage of the package,
performing with the first or the second device compliance measurements,
communicating with the first or the second device the compliance measurements to the server,
generating with the server evaluated compliance information by comparing the compliance information and the compliance measurements,
determining with the compliance enforcement process in the server the reliability of the first or the second device based on the evaluated compliance information, and
determining with the server the authentication information employed to authorize the handover of the package based on the reliability of the first or the second device.

15. The method of claim 10, further comprising:
a third device;
the third device having a processor, a memory and a proximity interface;
the authentication information comprising authentication information of the third device;
communicating with the third device authentication information over the proximity interface with the first or the second device or the package control device, and
determining with the third device the authorization of the handover of the package in addition to authorization performed by the first or the second device.

16. The method of claim 10, further comprising:
proximity information;
the proximity information comprising threshold information of proximity distance or timing of proximity entry or exit,
determining with the first or the second device the proximity information, and
determining with the first or the second device the handover by comparing the proximity information and threshold proximity information.

17. The method of claim 10, further comprising:
communicating with the server the transport and storage information with the first or the second device comprising a transport offer, a transport request and transport performance information, and
determining with the server the authentication information employed to authorize a handover of the package by comparing the transport offer and the transport request and the transport performance information.

18. The method of claim 10, further comprising:
a user interface;
the user interface configured for the presentation of the movement or direction of the user of the first or the second device relative to the package;
employing with the first or the second device the user interface to communicate to the user the authorization of the handover of the package.

* * * * *